United States Patent
Wang et al.

(10) Patent No.: US 10,711,019 B2
(45) Date of Patent: Jul. 14, 2020

(54) PHOTOINITIATORS FUNCTIONED AS BOTH INITIATORS AND NANOFILLERS

(71) Applicant: Agency for Science, Technology and Research, Singapore (SG)

(72) Inventors: Fuke Wang, Singapore (SG); Fei Wang, Singapore (SG); Chaobin He, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 0 days.

(21) Appl. No.: 15/752,866

(22) PCT Filed: Aug. 17, 2016

(86) PCT No.: PCT/SG2016/050397
§ 371 (c)(1),
(2) Date: Feb. 14, 2018

(87) PCT Pub. No.: WO2017/030504
PCT Pub. Date: Feb. 23, 2017

(65) Prior Publication Data
US 2018/0222929 A1 Aug. 9, 2018

(30) Foreign Application Priority Data
Aug. 18, 2015 (SG) .............................. 10201506500U

(51) Int. Cl.
*C08F 2/46* (2006.01)
*C08F 2/50* (2006.01)
(Continued)

(52) U.S. Cl.
CPC .................. *C07F 7/21* (2013.01); *C08F 2/48* (2013.01); *C08F 2/50* (2013.01); *C08G 77/38* (2013.01); *C08L 83/08* (2013.01); *C08G 77/24* (2013.01)

(58) Field of Classification Search
CPC ..... C07F 7/21; C08F 2/50; C08F 2/48; C08G 77/38
(Continued)

(56) References Cited

U.S. PATENT DOCUMENTS

| | | | |
|---|---|---|---|
| 6,254,802 B1 | 7/2001 | Speer et al. | |
| 2004/0033317 A1* | 2/2004 | Baudin ................ | C07C 45/46 427/487 |
| 2012/0142793 A1* | 6/2012 | Frey ..................... | C07F 7/21 521/50.5 |

FOREIGN PATENT DOCUMENTS

| | | |
|---|---|---|
| EP | 2130817 A1 | 12/2009 |
| EP | 2370449 B1 | 8/2013 |

(Continued)

OTHER PUBLICATIONS

Miyake et al, Aza-Wittig Polymerization: Kinetic Study and Efficient End Functionalization of poly(azomethine)s, 2009, Macromolecules, 42, 3463-3468 (Year: 2009).*

(Continued)

*Primary Examiner* — Jessica Whiteley
(74) *Attorney, Agent, or Firm* — Winstead PC

(57) ABSTRACT

This invention relates to a photoinitiator compound comprising: a polyhedral oligomeric silsesquioxane (POSS) moiety and a photoinitiator moiety, wherein the photoinitiator compound having the structure according to formula (I): $[R-SiO_{1.5}]_n$ (I), wherein n is 6, 8, 10 or 12 and R is independently selected from the group consisting of H, linear or branched (hetero)alkyl, linear or branched (hetero) alkenyl, (hetero)aryl, (hetero)alkyl aryl, (hetero)aryl alkyl and a photoinitiator moiety, wherein at least one R is a photoinitiator moiety and the photoinitiator compound is a nanoparticle. The present invention also relates to a method for the production of the photoinitiator compound of the invention, a photopolymerizable composition comprising the photoinitiator compound of the invention, the use of the photoinitiator compound of the invention for photopolymerization. The present invention is further related to a coated substrate comprising the photopolymerizable composition of the invention.

(Continued)

-continued

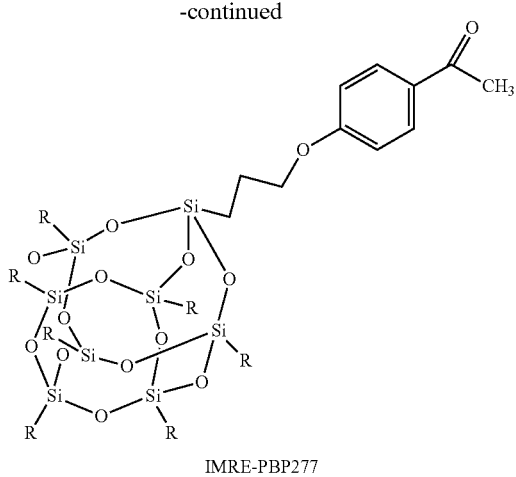

IMRE-PBP277

15 Claims, 17 Drawing Sheets

(51) Int. Cl.
*C08G 61/04* (2006.01)
*C07F 7/21* (2006.01)
*C08F 2/48* (2006.01)
*C08G 77/38* (2006.01)
*C08L 83/08* (2006.01)
*C08G 77/24* (2006.01)

(58) Field of Classification Search
USPC .............. 522/33, 6, 71, 189, 184, 1; 520/1
See application file for complete search history.

(56) References Cited

FOREIGN PATENT DOCUMENTS

| WO | 2008017593 A1 | 2/2008 |
| WO | 2012062333 A1 | 5/2012 |
| WO | 2013170859 A2 | 11/2013 |

OTHER PUBLICATIONS

Hou et al., "Multifunctional POSS-Based Nano-Photo-Initiator for Overcoming the Oxygen Inhibition of Photo Polymerization and for Creating Self-Wrinkled Patterns," Advanced Materials Interfaces, vol. 1, 1400385, 2014, pp. 1-8.
Holzinger et al., "Modified Cubic Spherosilicates as Macroinitiators for the Synthesis of Inorganic-Organic Starlike Polymers," Journal of Polymer Science: Part A: Polymer Chemistry, vol. 40, No. 21, Sep. 18, 2002, pp. 3858-3872.
Yang et al., "Cinnamate-Functionalized Cage Silsesquioxanes as Photoreactive Nanobuilding Blocks," Eur. J. of Inorg. Chem., vol. 2015, Nov. 26, 2014, pp. 99-103.
Chen et al., "Novel Multifunctional Hyperbranched Polymeric Photoinitiators with Built-In Amine Coinitiators for UV Curing," Journal of Materials Chemistry, vol. 17, 2007, pp. 3389-3392.
Chen et al., "Novel Multifunctional Polymeric Photoinitiators and Photo-Coinitiators Derived from Hyperbranched Polyglycerol," Macromolecular Chemistry and Physics, vol. 208, 2007, pp. 1694-1706.
Jun-Ichi Oku, "Impact Properties of Acrylic Denture Base Resin: Part 2 Effects of Temperature and Residual Monomer on Impact Characteristics," Dental Materials Journal, vol. 8, No. 2, 1989, pp. 186-193.
Liu et al., "Synthesis and Photochemistry of Monodisperse Oligomeric-Polymeric Photoinitiators," Chapter 9 of Photoinitiated Polymerization, Edited by Kevin D. Belfield and James V. Crivello, ACS Symposium Series, American Chemical Society, Washington, D.C., 2003, pp. 105-112.
Green, W.A., "Industrial Photoinitiators," Chapter 4, CRC Press, Boca Raton, Florida, 2010, pp. 75-113.
Fouassier et al., "Photoinitiators for Free Radical Polymerization Reactions," Chapter 10 of Photochemistry and Photophysics of Polymer Materials, Edited by Norman S. Allen, 2010, pp. 351-419.
International Preliminary Report on Patentability issued by the International Bureau of WIPO for International Application No. PCT/SG2016/050397 dated Feb. 20, 2018, pp. 1-7.
Written Opinion of the International Searching Authority for International Application No. PCT/SG2016/050397 dated Nov. 10, 2016, pp. 1-5.
Office Action from National Intellectual Property Administration of P.R.C. for Chinese Patent Application No. 201680048174.2 dated Dec. 12, 2019, pp. 1-8.
Xiong et al., "Synthesis and Properties of a Silsesquioxane Containing Macromolecular Photoinitiator," Journal of Wuhan University, Nat. Sci. Ed., vol. 61, No. 1, Feb. 2015, pp. 67-72, See Abstract.
Miyake et al., "Aza-Wittig Polymerization: A Simple Method for the Synthesis of Regioregular Poly(azomethine)s," Macromolecules, vol. 41, No. 24, 2008, pp. 9677-9682, See Abstract.
Chimjarn et al., "Synthesis of Aromatic Functionalized Cage-Rearranged Silsesquioxanes (T8, T10, and T12) via Nucleophilic Substitution Reactions," Dalton Transactions, 2012, pp. 916-919.
Chi et al., "Thermally Stable Azobenzene Dyes Through Hybridization with POSS," New J. Chem., vol. 37, 2013, pp. 735-742.

* cited by examiner (A)

(B)

Left: PPEGDA by BP (3 wt%)  $T_g$ = 100 °C

Right: PPEGDA by IMRE-PBP290 (3 wt%)  $T_g$ = 108 °C (A)

(B)

PHOTOINITIATORS FUNCTIONED AS BOTH INITIATORS AND NANOFILLERS

CROSS-REFERENCE TO RELATED APPLICATION

This application claims the benefit of priority of Singapore patent application No. 10201506500U filed on 18 Aug. 2015, the content of which is incorporated herein by reference in its entirety for all purposes.

FIELD OF THE INVENTION

The present invention lies in the field of chemistry and relates to a photoinitiator compound comprising: a polyhedral oligomeric silsesquioxane (POSS) moiety and a photoinitiator moiety, wherein the photoinitiator compound having the structure according to formula (I): $[R-SiO_{1.5}]_n$ (I), wherein n is 6, 8, 10 or 12 and R is independently selected from the group consisting of H, linear or branched (hetero)alkyl, linear or branched (hetero)alkenyl, (hetero)aryl, (hetero)alkyl aryl, (hetero)aryl alkyl and a photoinitiator moiety, wherein at least one R is a photoinitiator moiety and the photoinitiator compound is a nanoparticle. The present invention also relates to a method for the production of the photoinitiator compound of the invention, a photopolymerizable composition comprising the photoinitiator compound of the invention, the use of the photoinitiator compound of the invention for photopolymerization. The present invention is further related to a coated substrate comprising the photopolymerizable composition of the invention.

BACKGROUND OF THE INVENTION

Photopolymerization is a process of formation of cross-linked polymers from monomers or oligomers under exposure of light. Photopolymerization is also commonly recognized as a green and sustainable technology characterized by low electrical power input and energy requirements. The phase transition from liquid to solid in the light-induced polymerization reactions forms the basis of numerous traditional industrial applications of photopolymers in coatings, inks, adhesives, and optoelectronics. Photopolymerization technology is now expanded into a number of new emerging applications such as additive manufacturing (stereolithography and polyject) and nanotechnology due to their unique benefits of low temperature operation and no volatile organic compounds release (1. Photoresponsive Polymers; Krongauz, V., Trifunac, A., Eds.; Chapman and Hall: New York, N.Y., USA, 1994; 2. Belfied, K. D.; Crivello, J. V. Photoinitiated Polymerization; ACS Symp. Ser. 847; American Chemical Society: Washington, D.C., USA, 2003; 3. Green, W. A. Industrial Photoinitiators; CRC Press: Boca Raton, Fla., USA, 2010; 4. Photochemistry and Photophysics of Polymer Materials; Allen, N. S., Ed.; Wiley: Hoboken, N.J., USA, 2010).

Free radical photopolymerization (FRP) is undoubtedly the most popular photopolymerization technique, which involves a polymerizable radical matrix and a photoinitiating system (PIS). The PIS contains at least a photoinitiator (PI) and/or a photosensitizer (PS) to absorb the light (Fouassier, J. P.; Lalevée, J. Photoinitiators for Polymer Synthesis: Scope, Reactivity and Efficiency; Wiley VCH: Weinheim, Germany, 2012). FRP process is based on the application of a photoinitiating system, which converts absorbed light radiation into chemical energy in form of initiating species, such as free radicals, to induce polymerization of monomers. Nowadays, the FRP has made significant inroads in replacing traditional thermally cured and solvent-based technologies in large scale and high throughout manufacturing applications due to its high rates of polymerization and elimination of the use of volatile organic solvents. Along with many examples of commercial success of FRP in industry applications, the use of PIs in the polymerization processes still remains some safety and engineering issues. The discovery of contamination of baby milk with Isopropyl Thioxanthone (ITX) in 2005 caused a huge stir in the European food packaging market, where ITX was used as a photoinitiator in UV curable printing inks on the outer surface of liquid milk cartons. In 2009, the German authorities reported a migration of 4-Methyl Benzophenone (4-MBP) to muesli above the Specific Migration Limit (SML). Both PIs (ITX and 4-MBP) were able to migrate into the food due to their very small molecular weight. Furthermore, the residual PIs in the resulting polymer resins often lead to decrease of the mechanical properties and thermal stability of the resulting materials. Therefore, a new strategy to decrease PIs migration together with enhanced mechanical and thermal properties for photopolymerization is greatly anticipated (Oku J. Impact Properties of Acrylic Denture Base Resin. Part 2 Effects of Temperature and Residual Monomer on Impact Characteristics. Dent Mater J 1989; 8:186-193).

Hou et al. (Hou et al., Adv. Mater. Interfaces 2014, 1, 1400385) report the preparation of $F_2$-POSS-$(SH)_4$-TX-EDB and its use in initiating photopolymerization. However, each molecule of said compound comprises four thiol groups, two fluorinated carbon chains, the photoinitiator moiety TX and the co-initiator moiety EDB. These functional groups may course sterical issues (specifically after curing of the photopolymerizable polymer) that massively influence the chemical and physical properties of the prepared resin. Moreover, thiol groups and fluorinated carbon chains may provide safety drawbacks if the prepared resin is exposed to sensitive products, such as food, drinks, cosmetics etc.

EP 2370449 B1 discloses a photoactive moiety and an amine functionality, preferably a tertiary amino group, bonded to a polyhedral oligomeric silsesquioxane. Due to the branched amine functionality also these compounds, as described above, may course sterical issues (specifically after curing of the photopolymerizable polymer) that massively influence the chemical and physical properties of the prepared resin.

Hence, there is need in the art for photoinitiator compounds and resins/polymers prepared from said photoinitiator compounds that provide a safe use (also in sensitive products) and that demonstrate improved chemical and physical properties.

SUMMARY OF THE INVENTION

It is an object of the present invention to meet the above need by providing a new photoinitiator compound comprising: a polyhedral oligomeric silsesquioxane (POSS) moiety and a photoinitiator moiety, wherein the photoinitiator compound having the structure according to formula (I): $[R-SiO_{1.5}]_n$ (I), wherein n is 6, 8, 10 or 12 and R is independently selected from the group consisting of H, linear or branched (hetero)alkyl, linear or branched (hetero)alkenyl, (hetero)aryl, (hetero)alkyl aryl, (hetero)aryl alkyl and a photoinitiator moiety, wherein at least one R is a photoinitiator moiety and the photoinitiator compound is a nanoparticle. Surprisingly, the present inventors have found that the photoinitiator compound of the invention provides safe use and improved chemical and physical properties, such as higher thermal stability, higher free radical polymerization efficiency, higher solubility in organic solvents, improved mechanical and thermal properties of resulting polymers, when compared to commercially available photoinitiators.

Therefore, the design and synthesis of a new series PIs is reported that can both decrease the PIs migration and enhance the resulting polymers' mechanical and thermal properties by coupling PIs with nanofillers. The advantageous effects have observed especially for the specific combination of polyhedral oligomeric silsequioxane (POSS) containing eight Si-atoms and a small photoinitiator moiety according to formula (II). Nanofiller can be basically understood to be solid additives that differ from the polymer matrix in terms of their composition and structure. Nanofiller had a high significance in the plastics industry for many years because they can significantly improve or adjust the different properties of the materials into which they are incorporated. Here, polyhedral oligomeric silsesquioxanes (POSS) were chosen due to their well-defined nano-structures, facile chemical modification, and the commercial availability of various useful precursors for POSS modification. The new PIs can be facilely obtained by a simple coupling of POSS with commercial available PIs.

In a first aspect, the present invention is thus directed to a photoinitiator compound comprising: a polyhedral oligomeric silsesquioxane (POSS) moiety and a photoinitiator moiety, wherein the photoinitiator compound having the structure according to formula (I): $[R-SiO_{1.5}]_n$ (I), wherein n is 6, 8, 10 or 12 and R is independently selected from the group consisting of H, linear or branched (hetero)alkyl, linear or branched (hetero)alkenyl, (hetero)aryl, (hetero)alkyl aryl, (hetero)aryl alkyl and a photoinitiator moiety, wherein at least one R is a photoinitiator moiety and the photoinitiator compound is a nanoparticle.

In various embodiments of the invention, (a) n is 8; and/or (b) the photoinitiator moiety has the structure according to formula (II):

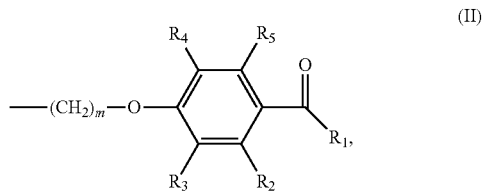

wherein m is an integer of 1 to 20 and $R_1$-$R_5$ are independently selected from the group consisting of H, linear or branched (hetero)alkyl, linear or branched (hetero)alkenyl, (hetero)aryl, (hetero)alkyl aryl and (hetero)aryl alkyl.

The scope of the present invention also encompasses various embodiments wherein the photoinitiator compound has the structure according to formula (III):

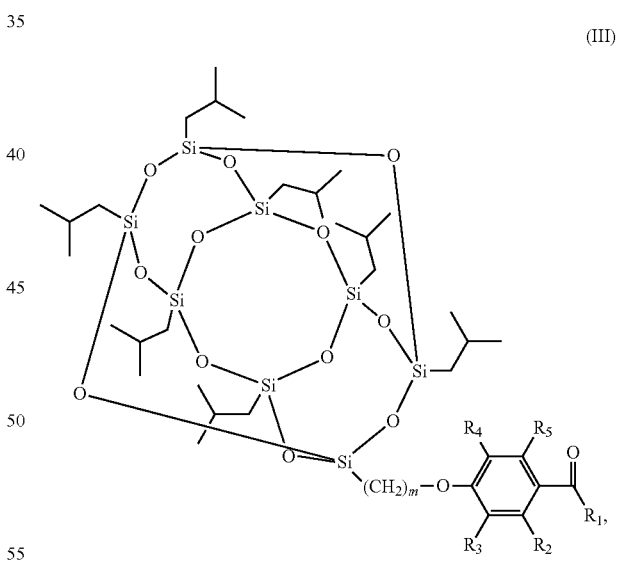

wherein m and $R_1$-$R_5$ are as defined above.

In still further various embodiments of the invention, m is 3.

Also encompassed by the scope of the present invention is that $R_2$-$R_5$ are H.

In various embodiments, the photoinitiator compound has a structure that is selected from formulas (IV)-(VI):

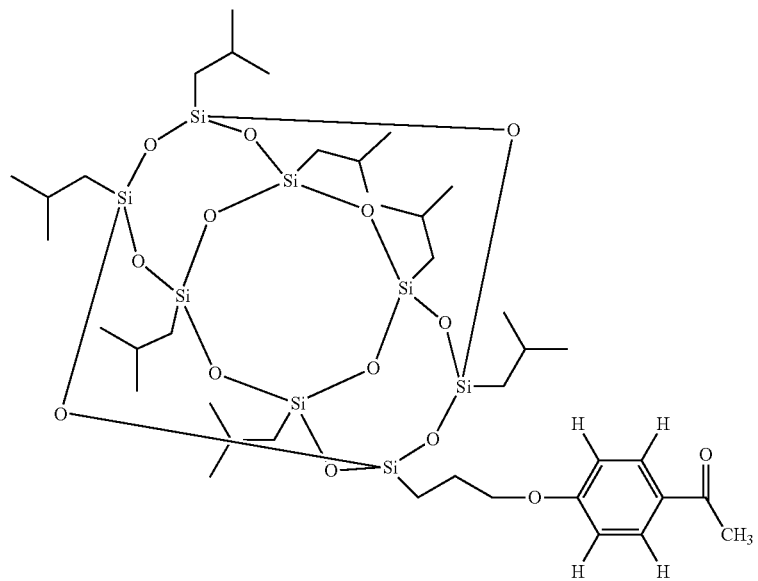
(IV)
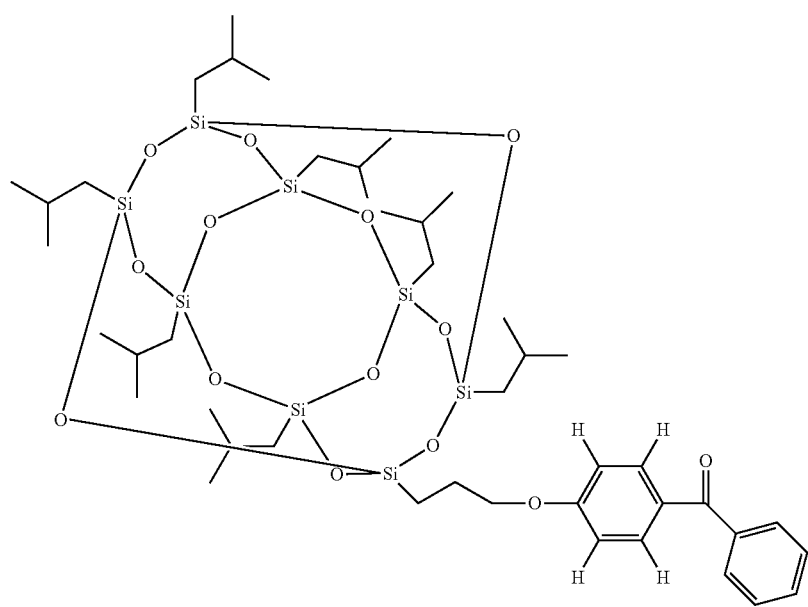
(V)

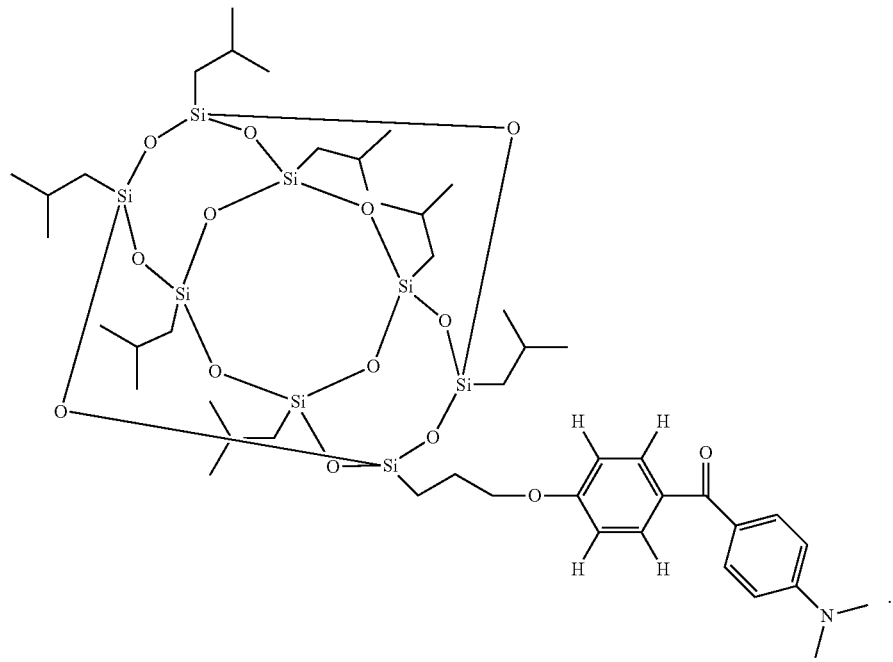
(VI)
In a further aspect, the present invention relates to a method for the production of the photoinitiator compound of the invention, comprising:
reacting a compound according to formula (VII)
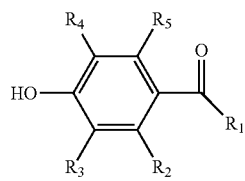
(VII)
wherein $R_1$-$R_5$ are as defined above,
with a compound according to formula (VIII)
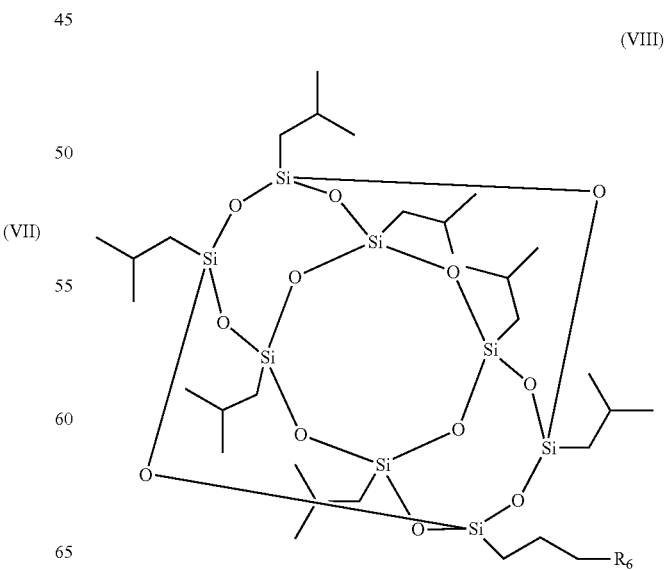
(VIII)

wherein $R_6$ is a halogen,
under conditions to produce the photoinitiator compound of the invention.

In various embodiments of the method of the invention, (a) $R_6$ is Br; (b) the compounds are reacted in the presence of tetrahydrofuran (THF), $K_2CO_3$ and/or 18-crown-6; (c) the compounds are reacted for 4-12 h; (d) the compounds are reacted at a temperature between 60-100° C.; and/or (e) the compounds are reacted under argon atmosphere.

In a third aspect, the invention relates to a photopolymerizable composition comprising (a) at least one photopolymerizable compound and (b) at least one photoinitiator compound of the invention.

In various embodiments, the photopolymerizable compound is methyl methacrylate (MMA) or poly (ethylene glycol) diacrylate (PEGDA).

Also encompassed by the scope of the present invention is that the photopolymerizable composition is cured.

In a fourth aspect, the present invention relates to the use of the photoinitiator compound of the invention for photopolymerization.

The scope of the present invention also encompasses various embodiments wherein the photopolymerizable composition of the invention is photopolymerized.

In a further aspect, the invention relates to a coated substrate coated on at least one surface with the photopolymerizable composition of the invention.

BRIEF DESCRIPTION OF THE DRAWINGS

The invention will be better understood with reference to the detailed description when considered in conjunction with the non-limiting examples and the accompanying drawings.

DETAILED DESCRIPTION OF THE INVENTION

Figure 1:
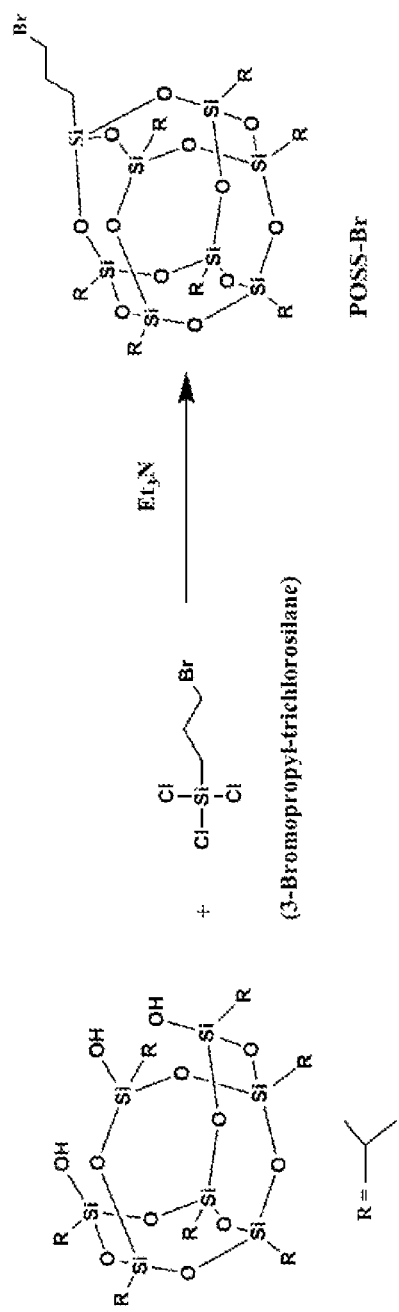
FIG. 1 shows the synthesis of POSS-Br.

The present inventors surprisingly found that photoinitiator can be modified by covalent attachment of polyhedral oligomeric silsesquioxane (POSS) and that this new photoinitiator compound provides several advantageous chemical and physical properties (especially thermal and mechanical properties) over comparable photoinitiators currently available on the market. Specifically, a photoinitiator compound comprising the combination of a photoinitiator moiety according to formula (II) and a POSS moiety containing eight Si-atoms, wherein one of these Si-atoms is modified with the photoinitiator moiety and the other Si-atoms are modified with iso-butyl, demonstrates improved properties, such as higher thermal stability, higher free radical polymerization efficiency, higher solubility in organic solvents, improved mechanical and thermal properties of resulting polymers, when compared to commercially available photoinitiators.

Therefore, in a first aspect, the present invention is thus directed to a photoinitiator compound comprising: a polyhedral oligomeric silsesquioxane (POSS) moiety and a photoinitiator moiety, wherein the photoinitiator compound having the structure according to formula (I): $[R-SiO_{1.5}]_n$ (I), wherein n is 6, 8, 10 or 12 and R is independently selected from the group consisting of H, linear or branched (hetero)alkyl, linear or branched (hetero)alkenyl, (hetero)aryl, (hetero)alkyl aryl, (hetero)aryl alkyl and a photoinitiator moiety, wherein at least one R is a photoinitiator moiety and the photoinitiator compound is a nanoparticle.

The terms "polyhedral oligomeric silsesquioxane" or "POSS", as interchangeably used herein, relate to nanostructures with the empirical formula $RSiO_{1.5}$, where R may be a hydrogen atom or an organic functional group, e.g., alkyl, alkylene, acrylate, hydroxyl or epoxide unit. POSS may be referred to as a silica nanoparticle consisting of a silica cage core, as well as other organic functional groups attached to the corners of the cage. POSS consists of both organic and inorganic matter with an inner core of inorganic silicon and oxygen and an outer layer of organic constituents, which could be either polar or nonpolar. POSS can be divided into molecular silica, monofunctional POSS and multifunctional POSS (Kuo, S. W.; Chang, F. C. POSS related polymer nanocomposites. *Prog. Polym. Sci.* 2011, 36, 1649-1696.). When all the organic groups are non-reactive, they are referred to as molecular silica. If one of the organic groups is reactive, these POSS are called monofunctional POSS or MonoPOSS. If more than one of the organic groups is reactive, they are known as multifunctional POSS. POSS molecules whose organic groups are all reactive are frequently encountered in the multifunctional POSS category. The photoinitiator compounds of the present invention are monofunctional or multifunctional POSS, preferably they are monofunctional POSS.

In various preferred embodiments, the photoinitiator compounds of the invention do not comprise substituents R that comprise one or more F-atoms, one or more S-atoms and/or one or more N-atoms.

The terms "photoinitiator", or "photoinitiator moiety", as interchangeably used herein, relate to a molecule that creates reactive species (free radicals, cations or anions) when exposed to radiation (UV or visible light). In preferred embodiments of the invention, the photoinitiator moiety is a radical photoinitiator moiety that can produce radical species under mild conditions and promote radical reactions. These radical photoinitiator moieties generally possess weak bonds that have small bond dissociation energies. In further preferred embodiments, the photoinitiator moiety has the structure according to formula (II):

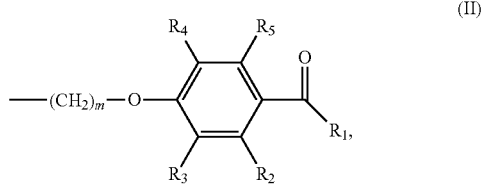

wherein m is an integer of 1 to 20 and $R_1$-$R_5$ are independently selected from the group consisting of H, linear or branched (hetero)alkyl, linear or branched (hetero)alkenyl, (hetero)aryl, (hetero)alkyl aryl and (hetero)aryl alkyl.

In preferred embodiments, m is 2-19, 3-18, 3-17, 3-15, 3-10 or 3-5. In various other preferred embodiments, m is 3 and/or $R_2$-$R_5$ are H.

The term "nanoparticle", as used herein, indicates a composite structure of nanoscale dimensions. In particular, nanoparticles are typically particles of a size in the range of from about 0.1 to about 1000 nm, and are usually spherical although different morphologies are possible depending on the nanoparticle composition. The portion of the nanoparticle contacting an environment external to the nanoparticle is generally identified as the surface of the nanoparticle. In nanoparticles herein described, the size limitation can be restricted to two dimensions and so that nanoparticles herein described include composite structure having a diameter from about 0.1 to about 1000 nm, where the specific diameter depends on the nanoparticle composition and on the intended use of the nanoparticle according to the experimental design. For example, nanoparticles to be used as photoinitiator compounds of the present invention can have a diameter ranging from 0.1 to 900 nm, 0.2 to 500 nm, 0.3 to 100 nm, 0.4 to 50 nm, 0.5 to 10 nm, 0.6 to 9 nm, 0.7 to 8 nm, 0.8 to 7 nm, 0.9 to 6 nm, or 1 to 5 nm.

The term "alkyl", as used herein, refers to a hydrocarbon group selected from linear and branched saturated hydrocarbon groups of 1-18, or 1-12, or 1-6 carbon atoms. Examples of the alkyl group include methyl, ethyl, 1-propyl or n-propyl ("n-Pr"), 2-propyl or isopropyl ("i-Pr"), 1-butyl or n-butyl ("n-Bu"), 2-methyl-1-propyl or isobutyl ("i-Bu"), 1-methylpropyl or s-butyl ("s-Bu"), and 1,1-dimethylethyl or t-butyl ("t-Bu"). Other examples of the alkyl group include 1-pentyl, 2-pentyl, 3-pentyl, 2-methyl-2-butyl, 3-methyl-2-butyl, 3-methyl-1-butyl, 2-methyl-1-butyl, 1-hexyl, 2-hexyl, 3-hexyl, 2-methyl-2-pentyl, 3-methyl-2-pentyl, 4-methyl-2-pentyl, 3-methyl-3-pentyl, 2-methyl-3-pentyl, 2,3-dimethyl-2-butyl and 3,3-dimethyl-2-butyl groups.

Lower alkyl means 1-8, preferably 1-6, more preferably 1-4 carbon atoms; lower alkenyl or alkynyl means 2-8, 2-6 or 2-4 carbon atoms.

The term "alkenyl", as used herein, refers to a hydrocarbon group selected from linear and branched hydrocarbon groups comprising at least one C=C double bond and of 2-18, or 2-12, or 2-6 carbon atoms. Examples of the alkenyl group may be selected from ethenyl or vinyl, prop-1-enyl, prop-2-enyl, 2-methylprop-1-enyl, but-1-enyl, but-2-enyl, but-3-enyl, buta-1,3-dienyl, 2-methylbuta-1,3-diene, hex-1-enyl, hex-2-enyl, hex-3-enyl, hex-4-enyl, and hexa-1,3-dienyl groups.

The term "alkynyl", as used herein, refers to a hydrocarbon group selected from linear and branched hydrocarbon group, comprising at least one C triple bond and of 2-18, or 2-12, or 2-6 carbon atoms. Examples of the alkynyl group include ethynyl, 1-propynyl, 2-propynyl (propargyl), 1-butynyl, 2-butynyl, and 3-butynyl groups.

The alkyl is also intended to include "cycloalkyl". The term "cycloalkyl", as used herein, refers to a hydrocarbon group selected from saturated and partially unsaturated cyclic hydrocarbon groups, comprising monocyclic and polycyclic (e.g., bicyclic and tricyclic) groups. For example, the cycloalkyl group may be of 3-12, or 3-8, or 3-6 carbon atoms. Even further for example, the cycloalkyl group may be a monocyclic group of 3-12, or 3-8, or 3-6 carbon atoms. Examples of the monocyclic cycloalkyl group include cyclopropyl, cyclobutyl, cyclopentyl, 1-cyclopent-1-enyl, 1-cyclopent-2-enyl, 1-cyclopent-3-enyl, cyclohexyl, 1-cyclohex-1-enyl, 1-cyclohex-2-enyl, 1-cyclohex-3-enyl, cyclohexadienyl, cycloheptyl, cyclooctyl, cyclononyl, cyclodecyl, cycloundecyl, and cyclododecyl groups.

Examples of the bicyclic cycloalkyl groups include those having 7-12 ring atoms arranged as a bicycle ring selected from [4,4], [4,5], [5,5], [5,6] and [6,6] ring systems, or as a bridged bicyclic ring selected from bicyclo[2.2.1]heptane, bicyclo[2.2.2]octane, and bicyclo[3.2.2]nonane. The ring may be saturated or have at least one double bond (i.e. partially unsaturated), but is not fully conjugated, and is not aromatic, as aromatic is defined herein.

The term "aryl", as used herein, refers to a group selected from: 5- and 6-membered carbocyclic aromatic rings, for example, phenyl; bicyclic ring systems such as 7-12 membered bicyclic ring systems wherein at least one ring is carbocyclic and aromatic, selected, for example, from naphthalene, indane, and 1,2,3,4-tetrahydroquinoline; and tricyclic ring systems such as 10-15 membered tricyclic ring systems wherein at least one ring is carbocyclic and aromatic, for example, fluorene.

For example, the aryl group is selected from 5- and 6-membered carbocyclic aromatic rings fused to a 5- to 7-membered cycloalkyl or heterocyclic ring optionally comprising at least one heteroatom selected from N, O, and S, provided that the point of attachment is at the carbocyclic aromatic ring when the carbocyclic aromatic ring is fused with a heterocyclic ring, and the point of attachment can be at the carbocyclic aromatic ring or at the cycloalkyl group when the carbocyclic aromatic ring is fused with a cycloalkyl group. Bivalent radicals formed from substituted benzene derivatives and having the free valences at ring atoms are named as substituted phenylene radicals. Bivalent radicals derived from univalent polycyclic hydrocarbon radicals whose names end in "-yl" by removal of one hydrogen atom from the carbon atom with the free valence are named by adding "-idene" to the name of the corresponding univalent radical, e.g., a naphthyl group with two points of attachment is termed naphthylidene. Aryl, however, does not encompass or overlap with heteroaryl, separately defined below. Hence, if one or more carbocyclic aromatic rings are fused with a heterocyclic aromatic ring, the resulting ring system is heteroaryl, not aryl, as defined herein.

The term "heteroalkyl", as used herein, refers to alkyl comprising at least one heteroatom.

The term "heteroaryl" refers to a group selected from:
5- to 7-membered aromatic, monocyclic rings comprising 1, 2, 3 or 4 heteroatoms selected from N, O, and S, with the remaining ring atoms being carbon;
8- to 12-membered bicyclic rings comprising 1, 2, 3 or 4 heteroatoms, selected from N, O, and S, with the remaining ring atoms being carbon and wherein at least one ring is aromatic and at least one heteroatom is present in the aromatic ring; and
11- to 14-membered tricyclic rings comprising 1, 2, 3 or 4 heteroatoms, selected from N, O, and S, with the remaining ring atoms being carbon and wherein at least one ring is aromatic and at least one heteroatom is present in an aromatic ring. For example, the heteroaryl group includes a 5- to 7-membered heterocyclic aromatic ring fused to a 5- to 7-membered cycloalkyl ring. For such fused, bicyclic heteroaryl ring systems wherein only one of the rings comprises at least one heteroatom, the point of attachment may be at the heteroaromatic ring or at the cycloalkyl ring.

When the total number of S and O atoms in the heteroaryl group exceeds 1, those heteroatoms are not adjacent to one another. In some embodiments, the total number of S and O atoms in the heteroaryl group is not more than 2. In some embodiments, the total number of S and O atoms in the aromatic heterocycle is not more than 1.

Examples of the heteroaryl group include, but are not limited to, (as numbered from the linkage position assigned priority 1) pyridyl (such as 2-pyridyl, 3-pyridyl, or 4-pyridyl), cinnolinyl, pyrazinyl, 2,4-pyrimidinyl, 3,5-pyrimidinyl, 2,4-imidazolyl, imidazopyridinyl, isoxazolyl, oxazolyl, thiazolyl, isothiazolyl, thiadiazolyl, tetrazolyl, thienyl, triazinyl, benzothienyl, furyl, benzofuryl, benzoimidazolyl, indolyl, isoindolyl, indolinyl, phthalazinyl, pyrazinyl, pyridazinyl, pyrrolyl, triazolyl, quinolinyl, isoquinolinyl, pyrazolyl, pyrrolopyridinyl (such as 1H-pyrrolo[2,3-b]pyridin-5-yl), pyrazolopyridinyl (such as 1H-pyrazolo[3,4-b]pyridin-5-yl), benzoxazolyl (such as benzo[d]oxazol-6-yl), pteridinyl, purinyl, 1-oxa-2,3-diazolyl, 1-oxa-2,4-diazolyl, 1-oxa-2,5-diazolyl, 1-oxa-3,4-diazolyl, 1-thia-2,3-diazolyl, 1-thia-2,4-diazolyl, 1-thia-2,5-diazolyl, 1-thia-3,4-diazolyl, furazanyl, benzofurazanyl, benzothiophenyl, benzothiazolyl, benzoxazolyl, quinazolinyl, quinoxalinyl, naphthyridinyl, furopyridinyl, benzothiazolyl (such as benzo[d]thiazol-6-yl), indazolyl (such as 1H-indazol-5-yl) and 5,6,7,8-tetrahydroisoquinoline.

The terms "heterocyclic" or "heterocycle" or "heterocyclyl", as interchangeably used herein, refer to a ring selected from 4- to 12-membered monocyclic, bicyclic and tricyclic, saturated and partially unsaturated rings comprising at least one carbon atoms in addition to 1, 2, 3 or 4 heteroatoms, selected from oxygen, sulfur, and nitrogen. "Heterocycle" also refers to a 5- to 7-membered heterocyclic ring comprising at least one heteroatom selected from N, O, and S fused with 5-, 6-, and/or 7-membered cycloalkyl, carbocyclic aromatic or heteroaromatic ring, provided that the point of attachment is at the heterocyclic ring when the heterocyclic ring is fused with a carbocyclic aromatic or a heteroaromatic ring, and that the point of attachment can be at the cycloalkyl or heterocyclic ring when the heterocyclic ring is fused with cycloalkyl.

"Heterocycle" also refers to an aliphatic spirocyclic ring comprising at least one heteroatom selected from N, O, and S, provided that the point of attachment is at the heterocyclic ring. The rings may be saturated or have at least one double bond (i.e. partially unsaturated). The heterocycle may be substituted with oxo. The point of the attachment may be carbon or heteroatom in the heterocyclic ring. A heterocyle is not a heteroaryl as defined herein. Examples of the heterocycle include, but not limited to, (as numbered from the linkage position assigned priority 1) 1-pyrrolidinyl, 2-pyrrolidinyl, 2,4-imidazolidinyl, 2,3-pyrazolidinyl, 1-piperidinyl, 2-piperidinyl, 3-piperidinyl, 4-piperidinyl, 2,5-piperazinyl, pyranyl, 2-morpholinyl, 3-moholinyl, oxiranyl, aziridinyl, fhiiranyl, azetidinyl, oxetanyl, thietanyl, 1,2-dithietanyl, 1,3-difhietanyl, dihydropyridinyl, tetrahydropyridinyl, thiomorpholinyl, thioxanyl, piperazinyl, homopiperazinyl, homopiperidinyl, azepanyl, oxepanyl, thiepanyl, 1,4-oxathianyl, 1,4-dioxepanyl, 1,4-oxafhiepanyl, 1,4-oxaazepanyl, 1,4-difhiepanyl, 1,4-fhiazepanyl and 1,4-diazepane 1,4-dithianyl, 1,4-azathianyl, oxazepinyl, diazepinyl, thiazepinyl, dihydrofhienyl, dihydropyranyl, dihydrofuranyl, tetrahydrofuranyl, tetrahydrothienyl, tetrahydropyranyl, tetrahydrothiopyranyl, 1-pyrrolinyl, 2-pyrrolinyl, 3-pyrrolinyl, indolinyl, 2H-pyranyl, 4H-pyranyl, 1,4-dioxanyl, 1,3-dioxolanyl, pyrazolinyl, pyrazolidinyl, dithianyl, difhiolanyl, pyrazolidinylimidazolinyl, pyrimidinonyl, 1,1-dioxo-thiomo holinyl, 3-azabicyco[3.1.0]hexanyl, 3-azabicyclo[4.1.0]heptanyl and azabicyclo[2.2.2]hexanyl.

The term "linear", as used herein, refers to each of the carbon atom backbone chains attached to the photoinitiator compound of the invention having no branch point. Thus, if the backbone atom is a carbon atom, this carbon atom is attached to two hydrogen atoms if said carbon atom is located within the backbone chain (internal carbon atom). If the carbon atom is located at the end of the chain (terminal carbon atom) it is attached to three hydrogen atoms. Similarly, if the atom of the backbone chain is a nitrogen atom it is considered to be linear if it is located within the backbone chain and is attached to one hydrogen atom (internal nitrogen atom; secondary amine). It the nitrogen atom is located at the end of the backbone chain, it is attached to two hydrogen atoms to be considered to be linear (terminal nitrogen atom; primary amine).

As used herein, "branched" means a chain of atoms with one or more side chains attached to it. Branching occurs by the replacement of a substituent, e.g, a hydrogen atom, with a covalently bonded substituent or moiety, e.g, an alkyl group.

The term "alkyl aryl", as used herein, generally refers to a chemical substituent containing an alkyl group coupled to an aryl group or a substituted aryl group. The terms "aralkyl" and "aryl alkyl," as used alone or in combination herein, are species of alkyl as defined herein, and particularly refer to an alkyl group as defined above in which one hydrogen atom is replaced by an aryl group as defined above.

In various preferred embodiments of the invention, in the structure according to formula (I): $[R\text{—}SiO_{1.5}]_n$ (I), n is 8.

The scope of the present invention also encompasses various embodiments wherein the photoinitiator compound has the structure according to formula (III):

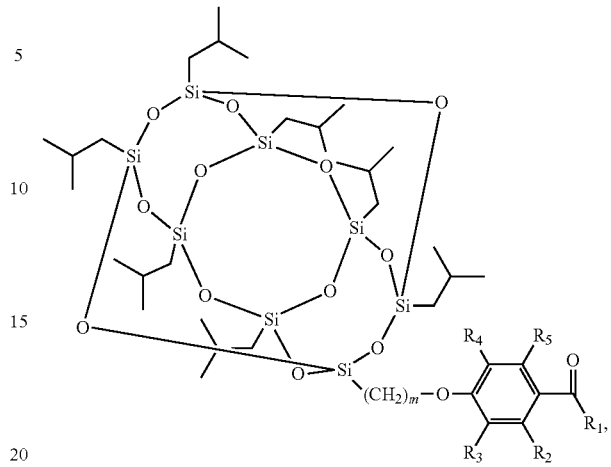

(III)

wherein m and $R_1$-$R_5$ are as defined above.

In various embodiments, the photoinitiator compound has a structure that is selected from formulas (IV)-(VI):

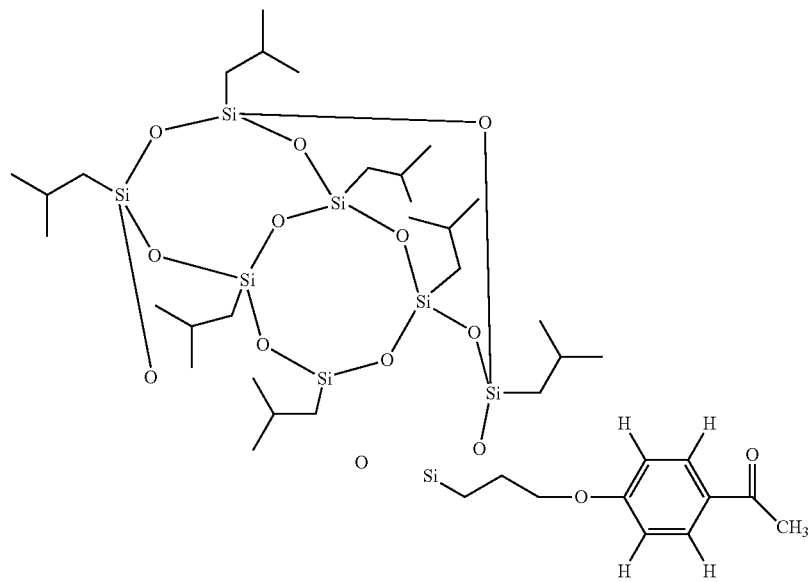

(IV)

(V)
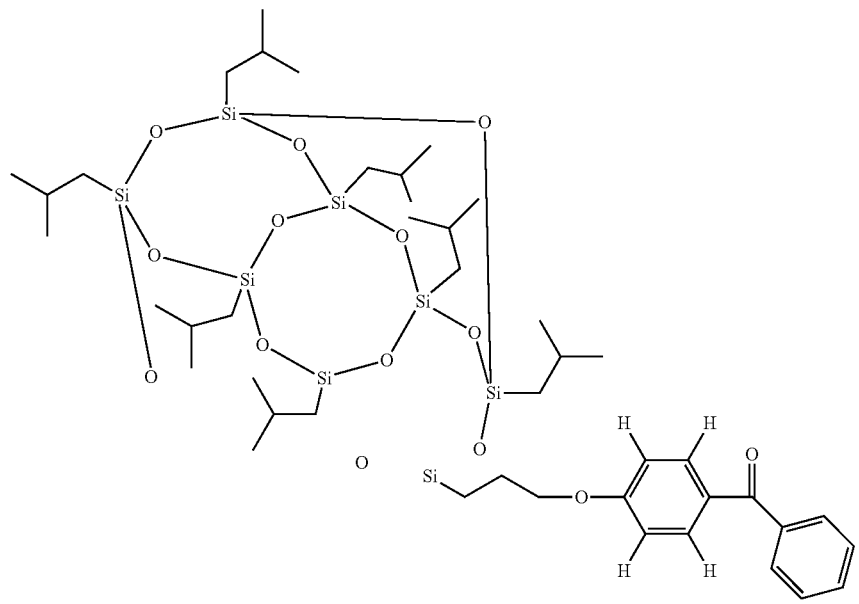
(VI)
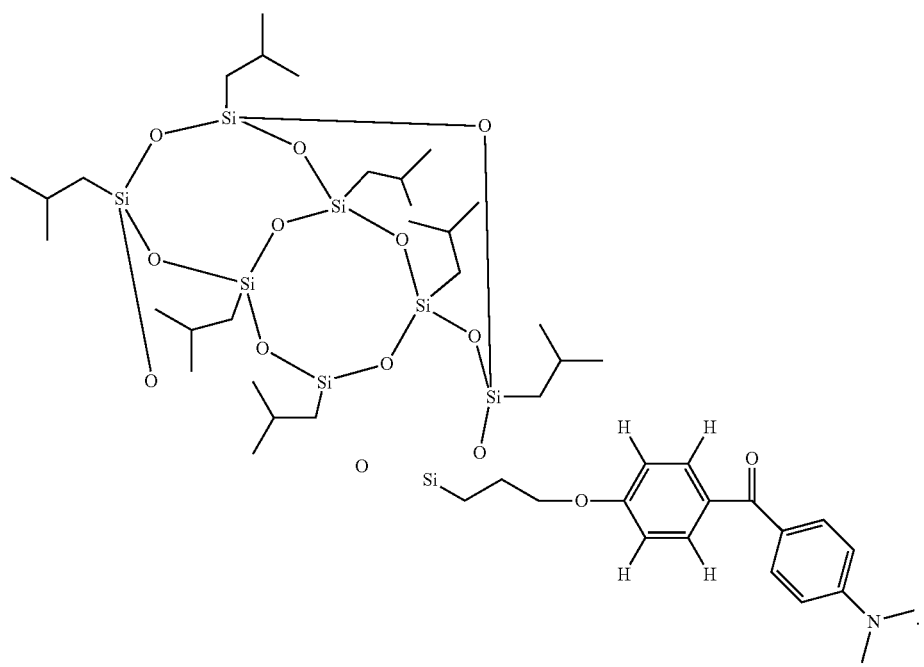
In a further aspect, the present invention relates to a method for the production of the photoinitiator compound of the invention, comprising:
reacting a compound according to formula (VII)
(VII)
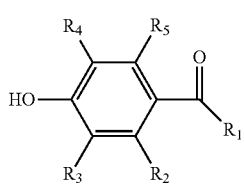

wherein $R_1$-$R_5$ are as defined above,
with a compound according to formula (VIII)

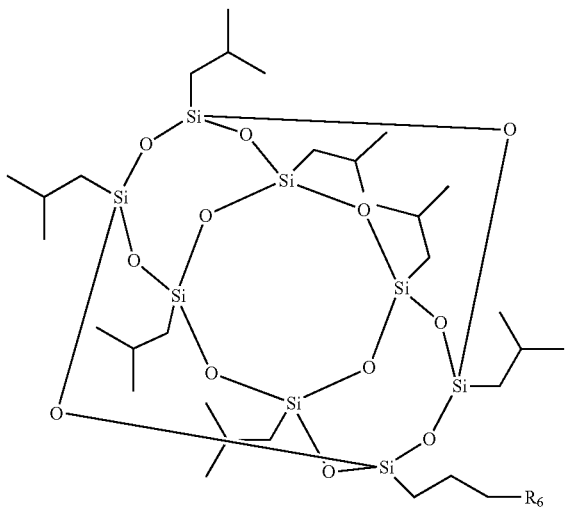

(VIII)

wherein $R_6$ is a halogen,
under conditions to produce the photoinitiator compound of the invention.

The term "reacting" as used with regard to the method of producing the photoinitiator compound of the invention refers to contacting the educts under conditions that allow formation of the product. Exemplary reaction conditions are described herein.

The term "halogen", as used herein, refers to a member of the halogen family selected from the group consisting of fluorine, chlorine, bromine, and iodine.

In various embodiments of the method of the invention, (a) $R_6$ is Br; (b) the compounds are reacted in the presence of tetrahydrofuran (THF), $K_2CO_3$ and/or 18-crown-6; (c) the compounds are reacted for 4-12 h; (d) the compounds are reacted at a temperature between 60-100° C.; and/or (e) the compounds are reacted under argon atmosphere.

The term "18-crown-6", as used herein, refers to an organic compound with the formula $[C_2H_4O]_6$ and the IUPAC name of 1,4,7,10,13,16-hexaoxacyclooctadecane. It is a white, hygroscopic crystalline solid with a low melting point. Like other crown ethers, 18-crown-6 functions as a ligand for some metal cations with a particular affinity for potassium cations (binding constant in methanol: $10^6$ $M^{-1}$). The point group of 18-crown-6 is $S_6$. The dipole moment of 18-crown-6 varies in different solvent and under different temperature. Under 25° C., the dipole moment of 18-crown-6 is 2.76±0.06 D in cyclohexane and 2.73±0.02 in benzene.

In various preferred embodiments, the reacting step in the method of production of the photoinitiation compound of the invention is carried out for 5-11 hours, 6-10 hours or 7-9 hours. More preferably, the reaction time is 8 hours. In other various embodiments, the temperature of the reaction step is 65-95° C., 70-90° C. or 75-85° C. In more preferred embodiments of the invention, the reaction temperature is 80° C.

In a third aspect, the invention relates to a photopolymerizable composition comprising (a) at least one photopolymerizable compound and (b) at least one photoinitiator compound of the invention.

In various embodiments, the photopolymerizable compound is methyl methacrylate (MMA) or poly (ethylene glycol) diacrylate (PEGDA).

Also encompassed by the scope of the present invention is that the photopolymerizable composition is cured.

In a fourth aspect, the present invention relates to the use of the photoinitiator compound of the invention for photopolymerization.

The scope of the present invention also encompasses various embodiments wherein the photopolymerizable composition of the invention is photopolymerized.

In a further aspect, the invention relates to a coated substrate coated on at least one surface with the photopolymerizable composition of the invention.

"At least one", as used herein, relates to one or more, in particular 1, 2, 3, 4, 5, 6, 7, 8, 9, 10 or more.

The term "cure" or "curing," as used herein, refers to a change in state, condition, and/or structure in a material that is usually, but not necessarily, induced by at least one variable, such as time, temperature, moisture, radiation, presence and quantity in such material of a curing catalyst or accelerator, or the like. The terms cover partial as well as complete curing.

The term "photopolymerization", as used herein, refers to a process of reacting monomer or oligomer molecules together in a chemical reaction to form polymer chains or three-dimensional networks, wherein the reaction is initiated by a photoreaction, such as but not limited to a free radical photopolymerization (FRP). Thus, the photopolymer is a polymer that changes its properties when exposed to light, preferably the ultraviolet or visible region of the electromagnetic spectrum.

The properties of a photocured material, such as flexibility, adhesion, and chemical resistance are provided by the photopolymerizable compound present in the photopolymerizable composition. Photopolymerizable compounds comprise oligomers and monomers. Oligomers are typically epoxides, urethanes, polyethers, or polyesters, each of which provide specific properties to the resulting material. Each of these oligomers are typically functionalized by an acrylate. An example is an epoxy oligomer that has been functionalized by acrylic acid. Acrylated epoxies are useful as coatings on metallic substrates, and result in glossy hard coatings. Acrylated urethane oligomers are typically abrasion resistant, tough, and flexible making ideal coatings for floors, paper, printing plates, and packaging materials. Acrylated polyethers and polyesters result in very hard solvent resistant films, however, polyethers are prone to UV degradation and therefore are rarely used in UV curable material. Often formulations are composed of several types of oligomers to achieve the desirable properties for a material. Suitable materials are well-known in the art.

The monomers used in radiation curable systems help control the speed of cure, crosslink density, final surface properties of the film, and viscosity of the resin. Examples of monomers include styrene, N-vinylpyrrolidone, and acrylates. Styrene is a low cost monomer and provides a fast cure, N-vinylpyrrolidone results in a material that is highly flexible when cured, has low toxicity, and acrylates are highly reactive, allowing for rapid cure rates, and are highly versatile with monomer functionality ranging from monofunctional to tetrafunctional. Like oligomers, several types of monomers can be employed to achieve the desirable properties of the final material.

The term "substrate", as used herein, is to be understood to include, inter alia, any suitable substrate, material, component, or layer, which may be used for coating purposes. In various embodiments, the substrate may be one layer of the photopolymerizable composition, which is coated with another layer of the same material or a different photopolymerizable composition of the invention to thicken the coating and/or to build up a solid structure of several layers of the photopolymerizable composition of the invention, such as used for 3D-printing.

"Surface", as used herein, refers to the outermost boundary of the substrate. The surface includes the top surface, the bottom surface and optionally the side surfaces. In various embodiments, the term "surface" refers to at least 5%, at least 10%, at least 20%, at least 30%, at least 40%, at least 50%, at least 60%, at least 70%, at least 80%, at least 90% or at least 95% of the outermost boundary of the substrate. Thus, in case the substrate has a ball-like shape and one hemisphere is coated with the photopolymerizable composition of the invention whereas the other one is non-coated, the surface of said substrate is "coated" within the meaning of the present invention.

The term "coating", as used herein, refers to a process for covering or surrounding a single particle/substrate with one or more layers of a coat forming material, here the photopolymerizable composition of the invention, to stabilize the particle. The term "coated", as used herein, has a somewhat different meaning compared to "coating" and refers to a single or individual substrate/particle which is covered with or surrounded by a coat forming material, wherein the coat forming material remains distinct from the single particle that it covers, and with whose aid the particle is stabilized. While the covering by the coat forming material does not necessarily need to be uniform or to cover or surround the entire particle surface, the covering by the coat forming material should be sufficient to impart improved stability. Preferably, but not necessarily, the coating material will completely cover or encase the particle in a substantially uniform layer. It is also preferable that the coated particle, when dried, has no substantial gain in moisture relative to its uncoated form. The term "wet coating", as used herein, refers to a coating process wherein a particle to be coated is coated in wet form, the process does require dispersing or suspending, but not dissolving, the particle in a continuous liquid phase prior to coating and, at conclusion of the process, the dry coated particle has no substantial gain in moisture relative to its uncoated form.

EXAMPLES

Example 1: Synthesis of POSS-Br

Figure 3:
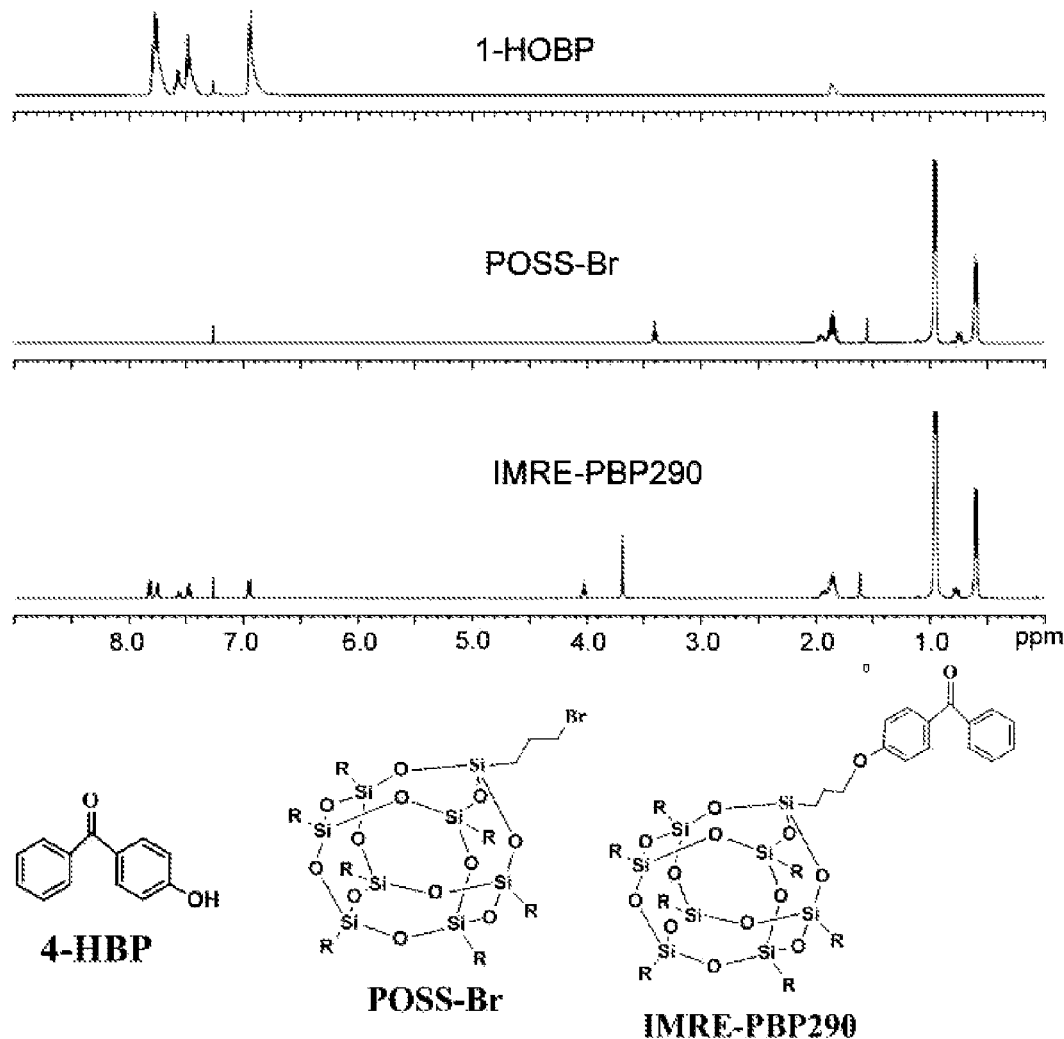
FIG. 3 shows NMR-spectra of 4-HAP, POSS-Br and IMRE-PBP277.

Trisilano-isobutyl POSS (6.14 g, 7.76 mmol) and triethylamine (4.45 ml, 43.9 mmol) as a catalyst, were added into 250 mL three-necked round bottom flask with dry THF (100 ml). The solution was stirred for 30 min to an hour to ensure thorough mixing. 3-Bromopropyl-trichlorosilane (0.745 ml, 4.78 mmol) was added dropwisely over a period of 10 minutes to the solution in the flask with an ice bath under an argon atmosphere. The mixture was left to be stirred continually overnight before centrifugation was carried out to separate the liquids from solid that are held in suspension. This is to aid filtration which will be performed next in order to remove the HCl precipitate. After almost completely evaporating the volatile compounds using rotary evaporator at 105 rpm, methanol was added to precipitate POSS-Br, which was separated by filtration and dried under vacuum. $^1$H NMR (400 MHz, CDCl3): δ=3.43 ppm (t, 2H, CH2Br), 1.9-2.0 ppm (m, 2H, CH2CH2Br), 1.72 ppm (b, 28H, CH(CH2)2), 1.22 ppm (b, 44H, CH2CH2CH2), 0.61 ppm (m, 7H, CH(CH2)2); FTIR (KBr): ν=1108 cm$^{-1}$ (Si—O—Si), 2849 cm$^{-1}$ (Si—O—Si), 2922 cm$^{-1}$ (Si—O—Si) (FIGS. 1 and 3).

Example 2: Synthesis of IMRE-PBP277

Figure 2:
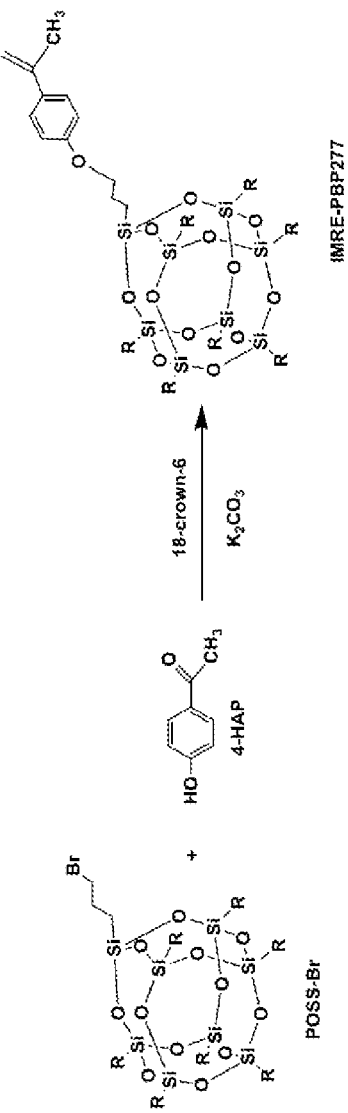
FIG. 2 shows the synthesis of IMRE-PBP277.

POSS-Br prepared as described above (1.18 g, 1.257 mmol) and 4-Hydroxyacetophenone (4-HAP) (184.80 mg, 1.357 mmol) were added into 150 ml three-necked round bottom flask to be dissolved in freshly distilled THF (50 ml). $K_2CO_3$ (1.6 g) catalyst and a few drops of 18-crown-6 (0.5 ml) phase transfer agent were added into the flask of solution and stirred under an argon atmosphere at 80° C. using oil bath overnight. After reaction, distilled water was added to dissolve $K_2CO_3$ and 18-crown-6. Then, ethyl ether was added to extract the organic phase and separate the water phase 5-10 times using phase separator glassware. $MgSO_4$ was added into the organic phase to absorb water after rounds of extractions. Filtration was required to remove the insoluble $MgSO_4$ solid. The extract was then rotary evaporated under vacuum and the residue was dissolved in THF again. Methanol was added to induce precipitation before drying the product under vacuum. $^1$H NMR of IMRE-PBP-277 (CDCl3, 400 MHz, 80% yield): δ=4.05 ppm (APOCH2), 7.00 ppm (d, 2H, Ar—H), 7.42-7.51 ppm (t, 3H, Ar—H), 7.48-7.52 ppm (d, 2H, Ar—H), 7.88-7.92 ppm (m, 2H, Ar—H). 1.83 ppm (b, 28H, CH(CH2)2), 0.95 ppm (b, 44H, CH2CH2CH2), 0.58 ppm (m, 7H, CH(CH2)2) (FIGS. 2 and 3).

Example 3: Synthesis of IMRE-PBP290

Figure 4:
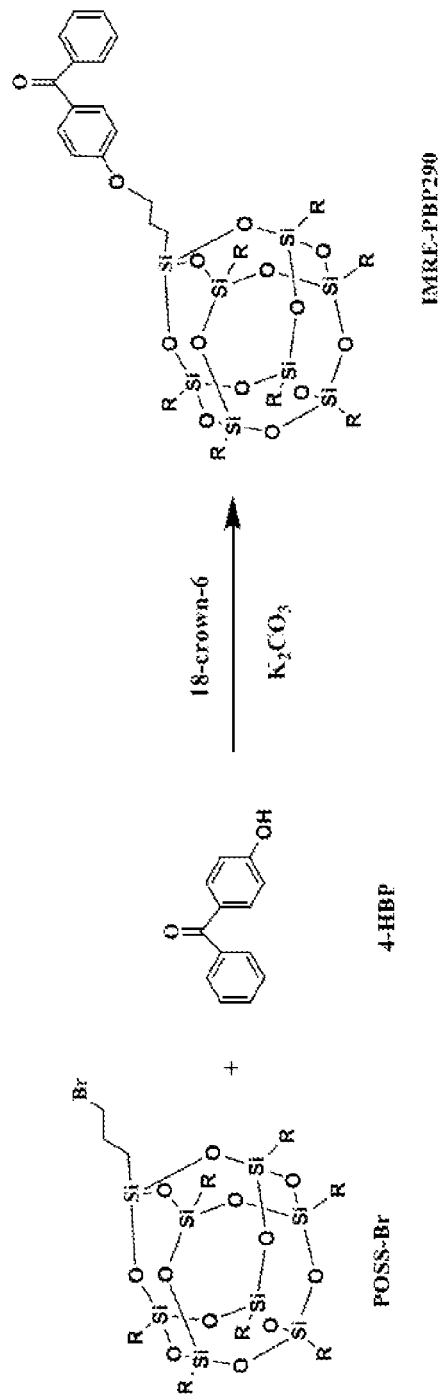
FIG. 4 shows the synthesis of IMRE-PBP290.
Figure 5:
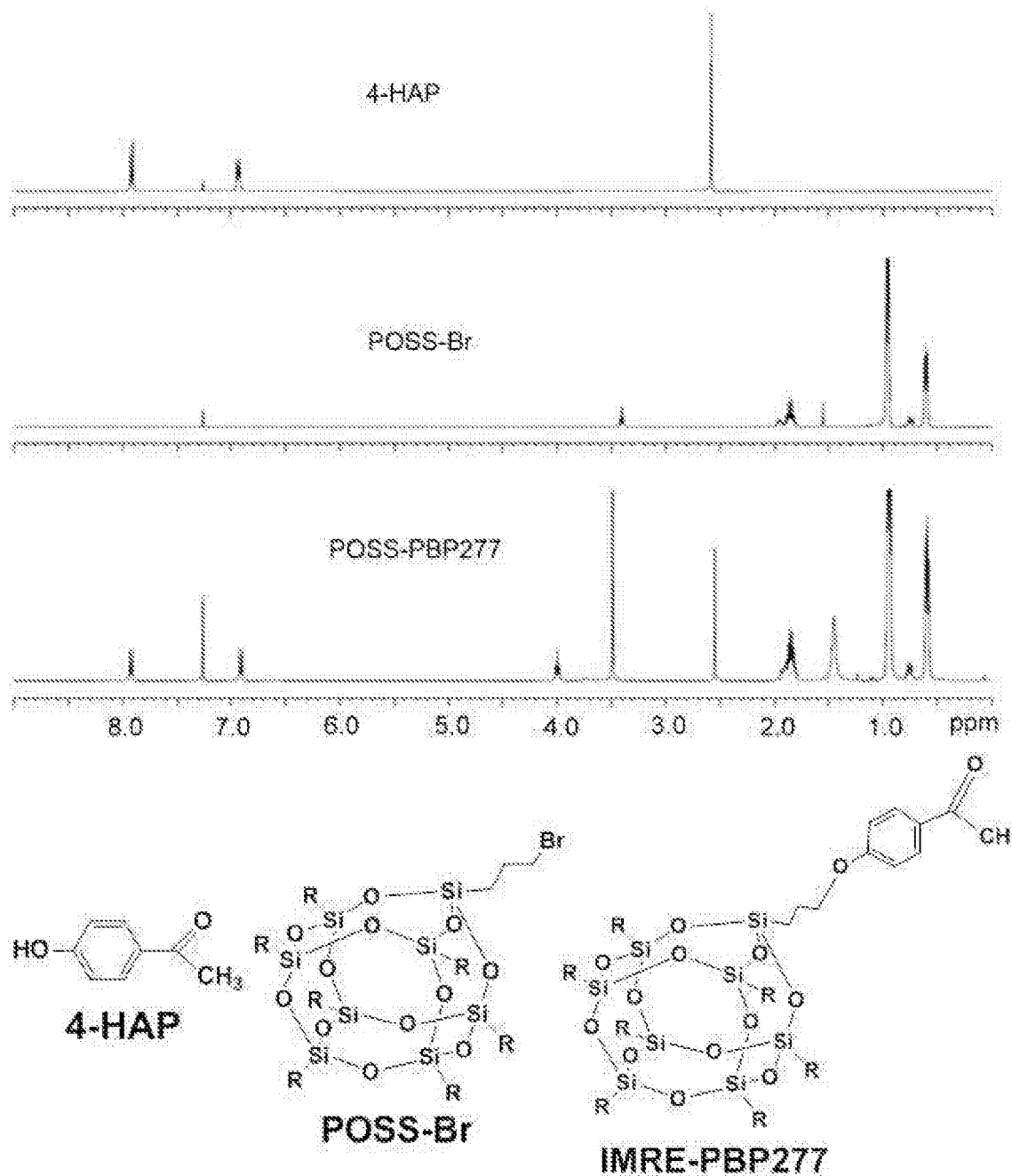
FIG. 5 shows NMR-spectra of 4-HBP, POSS-Br and IMRE-PBP290.

POSS-Br prepared as described above (1.18 g, 1.257 mmol) and 4-Hydroxybenzophenone (4-HBP) (268.98 mg, 1.357 mmol) were added into 150 ml three-necked round bottom flask to be dissolved in freshly distilled THF (50 ml). $K_2CO_3$ (1.6 g) catalyst and a few drops of 18-crown-6 (0.5 ml) phase transfer agent were added into the flask of solution and stirred under an argon atmosphere at 80° C. using oil bath overnight. After reaction, distilled water was added to dissolve $K_2CO_3$ and 18-crown-6. Then, chloroform was added to extract the organic phase and separate the water phase 5-10 times using phase separator glassware. $MgSO_4$ was added into the organic phase to absorb water after rounds of extractions. Filtration was required to remove the insoluble $MgSO_4$ solid. The extract was then rotary evaporated under vacuum and the residue was dissolved in THF again. Methanol was added to induce precipitation before drying the product under vacuum. $^1$H NMR of IMRE-PBP290 (CDCl3, 400 MHz, 75% yield): δ=4.05 ppm (t, 1H, Ar—OCH2), 6.95 ppm (d, 2H, Ar—H), 7.47 ppm (t, 2H, Ar—H), 7.56 ppm (t, 1H, Ar—H), 7.80-7.90 ppm (d, 2H, Ar—H). 1.83 ppm (b, 28H, CH(CH2)2), 0.95 ppm (b, 44H, CH2CH2CH2), 0.58 ppm (m, 7H, CH(CH2)2) (FIGS. 4 and 5).

Example 4: Synthesis of (4-(dimethylamino)phenyl) (4-hydroxyphenyl)methanone

Figure 6:
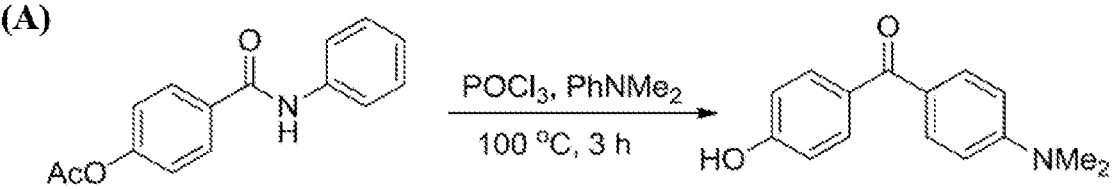
FIG. 6 shows the synthesis and characterization of compound IMRE-PBP350. (A) Synthesis of (4-(dimethylamino)phenyl)(4-hydroxyphenyl)methanone. (B) NMR-spectra of IMRE-PBP350 and the structure of said compound.
Figure 6:
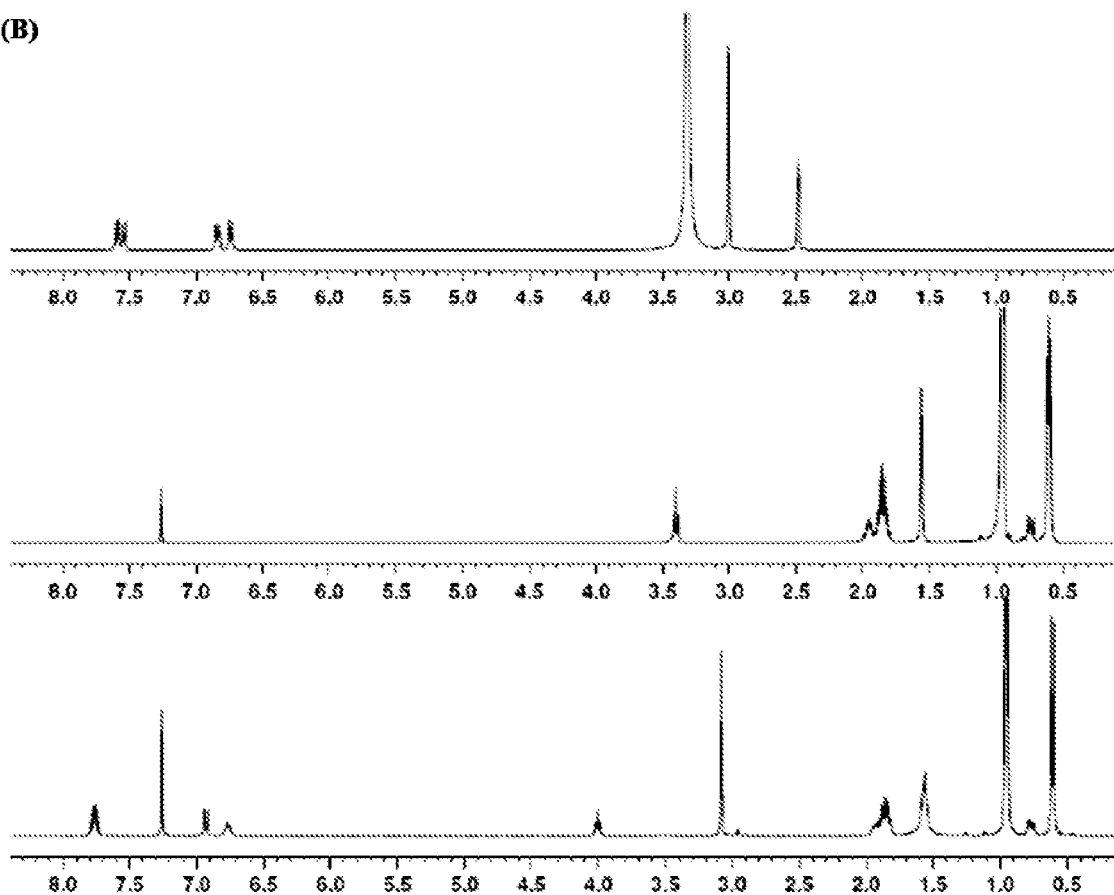
Figure 6:
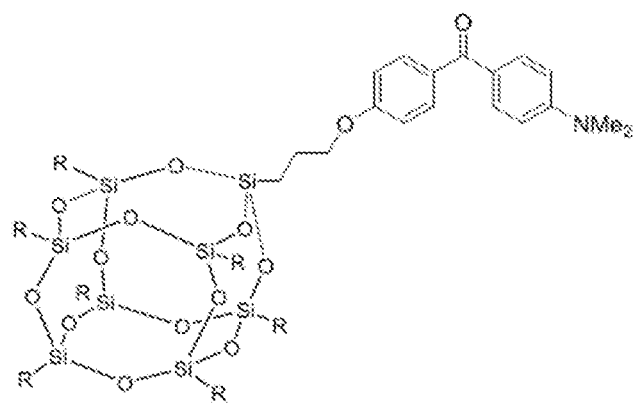

A mixture of amide (15 mmol, 3.825 g), N,N-dimethylaniline (52.5 mmol, 6.7 mL, 3.5 eq) and phosphoryl chloride (37.5 mmol, 3.5 mL, 2.5 eq) was stirred at 100° C. for 3 h. After cooled down, the reaction was quenched carefully by a mixture of 15 mL concentrated hydrochloride acid and 20 mL water and then refluxed for 1 h. The reaction mixture was then poured into 250 mL ice water and extracted by ethyl acetate (250 mL×3). The organic lays were then dried, concentrated and purified by flash chromatography (eluent: hexane/ethyl acetate=1/2). The product was further purified by recrystallization using methanol as solvent and obtained as a yellow solid (2.17 g, yield 60%). $^1$H NMR (400 MHz, DMSO-d6) 7.59 (d, J=8.0 Hz, 2H), 7.54 (d, J=8.0 Hz, 2H), 6.84 (d, J=8.0 Hz, 2H), 7.74 (d, J=8.0 Hz, 2H), 3.01 (s, 6H) (FIG. 6 (A)).

Example 5: Synthesis of (4-(dimethylamino)phenyl) (3-hydroxyphenyl)methanone

The compound was synthesized using the same procedure mentioned in Example 4. Yellow solid (1.81 g, yield 50%).

Example 6: Synthesis of IMRE-PBP350

General procedure for the coupling between photo initiator and POSS moiety: PI—OH (1.5 mmol) and POSS-Br (1.12 g, 1.0 mmol) were dissolved in freshly distilled THF (30 mL). After adding $K_2CO_3$ (414 mg, 3 mmol) and 18-crown-6 (660 mg, 2.5 mmol) the mixture was refluxed under argon atmosphere overnight. After reaction, distilled water (10 mL) was added to dissolve the $K_2CO_3$ and 18-crown-6. The mixture was extracted by ethyl acetate (60 mL×3). The organic layers were combined, dried and concentrated. The crude product was purified by flash chromatography (eluent: hexane/ethyl acetate=1/5) and further purified by recrystallization using methanol as solvent (FIG. 6 (B)).

Example 7: Preparation of the IMRE-PBP290 Initiated PMMA Resin 3 wt % of photoinitiator HBP (71.63 mg, 1.445 mmol) or POSS-BP (383.8 mg, 1.445 mmol) was dissolved in 2.5 ml of methyl methacrylate (MMA) monomer with TEOA (13.83 ml, $2.2\times10^{-2}$ molL$^{-1}$), which promote the photopolymerisation rate, in a glass vial. Purging with Ar gas was conducted for 30 min to remove oxygen which is a known UV quencher. The glass vial is then placed in a Spectrolinker™ XL-1000 UV Crosslinker with 5 UV tubes (8 watt) at 254 nm at intensity of 0.12 J/cm$^2$, which was performed over time interval of 15 min.

Example 8: Preparation of the IMRE-PBP277 Initiated PMMA Resin 3 wt % of photoinitiator HAP (71.6 mg, 1.445 mmol) or POSS-BP (522.6 mg, 1.445 mmol) was dissolved in 2.5 ml of methyl methacrylate (MMA) monomer with TEOA (13.83 ml, $2.2\times10^{-2}$ molL$^{-1}$), which promote the photopolymerisation rate, in a glass vial. Purging with Ar gas was conducted for 30 min to remove oxygen which is a known UV quencher. The glass vial is then irradiated by RAYONET Photochemical Reactor Model RPR-100 with an UV lamp of 300 nm for 1 hour.

Example 9: Preparation of the IMRE-PBP290 Initiated PEGDA Resin 1 g PEGDA, 30 mg photo initiator and 30 mg (EtOH)$_3$N were mixed and stirred overnight in the absence of light. 0.5 ml of the prepared resin was added into petri dish with a diameter of 3 cm and height of around 0.8 cm. The petri dish was then placed in a Luzchem photoreactor installed with ten LZC-UVB amps (five lamps from each side) and the resin was cured in the photoreactor for 30 mins. After polymerization, the sample was washed with ethanol thoroughly and detached from the petri dish. The sample was then put back into the photoreaction and post-cured for 30 mins.

Example 10: Thermal Analysis

Figure 7:
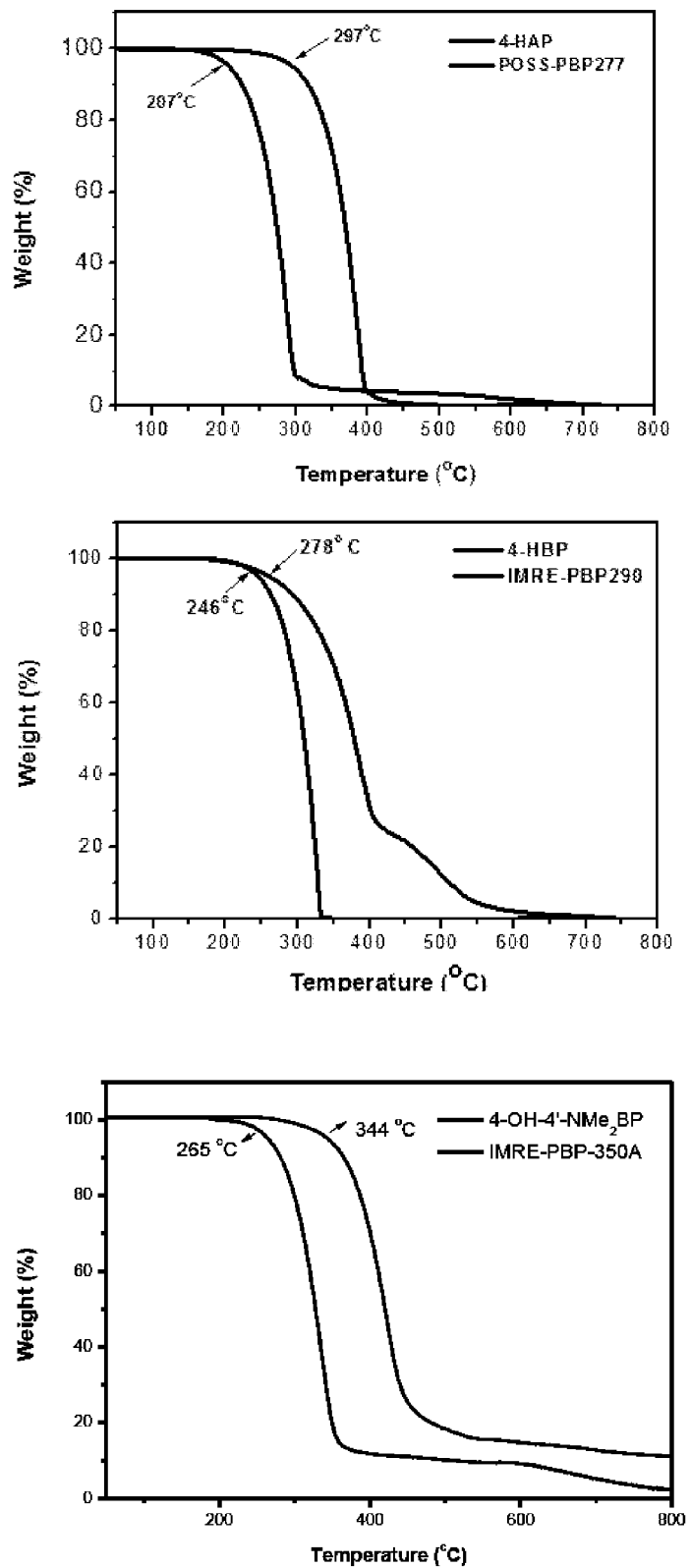
FIG. 7 shows thermogravimetric analysis (TGA) thermograms of a) 4-HAP, IMRE-PBP277 in $N_2$, b) 4-HBP and IMRE-PBP290 in $N_2$ and c) BP-dimethylaniline and IMRE-PBP350A.

Thermogravimetric analysis (TGA) measures weight changes in a material as a function of temperature (or time) under a controlled atmosphere. Thermal characteristics of 4-HAP, 4-HBP, IMRE-PBP277 and IMRE-PBP290, IMRE-PBP350 were investigated using TGA under inert nitrogen atmosphere. TGA curves of the 4-HAP, 4-HBP, IMREPBP277 and IMRE-PBP290, IMRE-PBP350 samples were recorded when heated to 800° C. at a heating rate of 20° C. min$^{-1}$ under nitrogen atmosphere. The results are listed in FIG. 7.

Example 11: UV Absorption Properties

Figure 8:
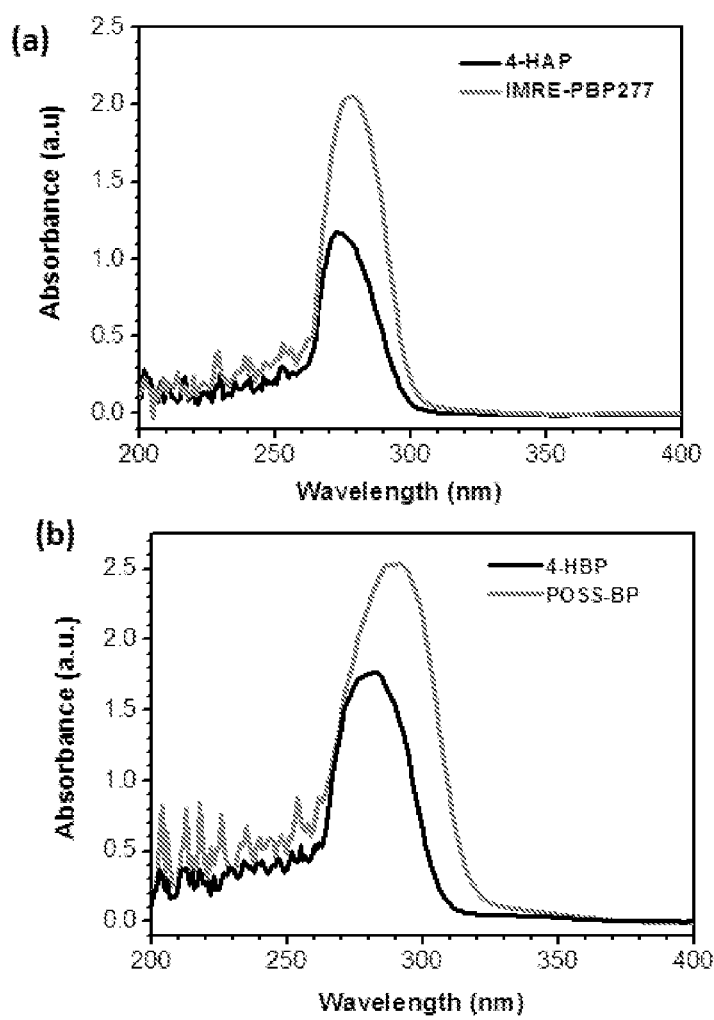
FIG. 8 shows UV absorption spectra of a) 4-HAP, IMRE-PBP277 in $CHCl_3$ solution of $1.475 \times 10^{-4}$ mol/L and b) 4-HBP and IMRE-PBP290 in $CHCl_3$ solution of $1.68 \times 10^4$ mol/L.
Figure 9:
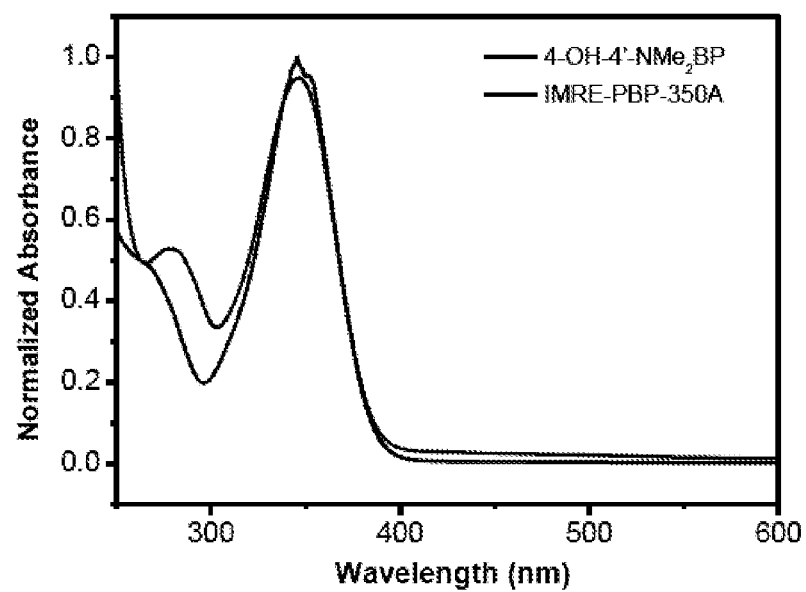
FIG. 9 shows UV absorption spectra of BP-dimethylaniline and IMRE-PBP350A, IMREPBP350B.
Figure 9:
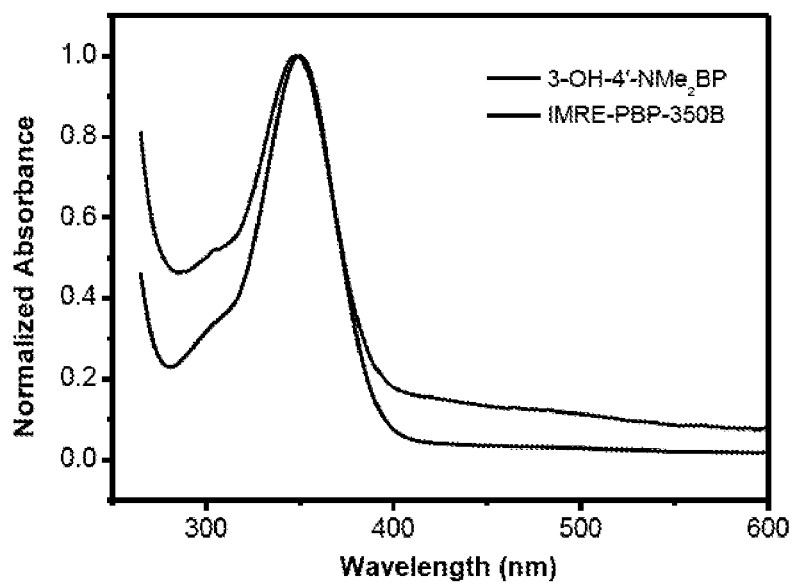

The UV absorption spectra of 4-HAP, 4-HBP, IMRE-PBP277 and IMRE-PBP290, IMREPBP350 were investigated with CHCl$_3$ as a solvent. The results are shown in FIGS. 8 and 9.

Example 12: Photostability Test

Figure 10:
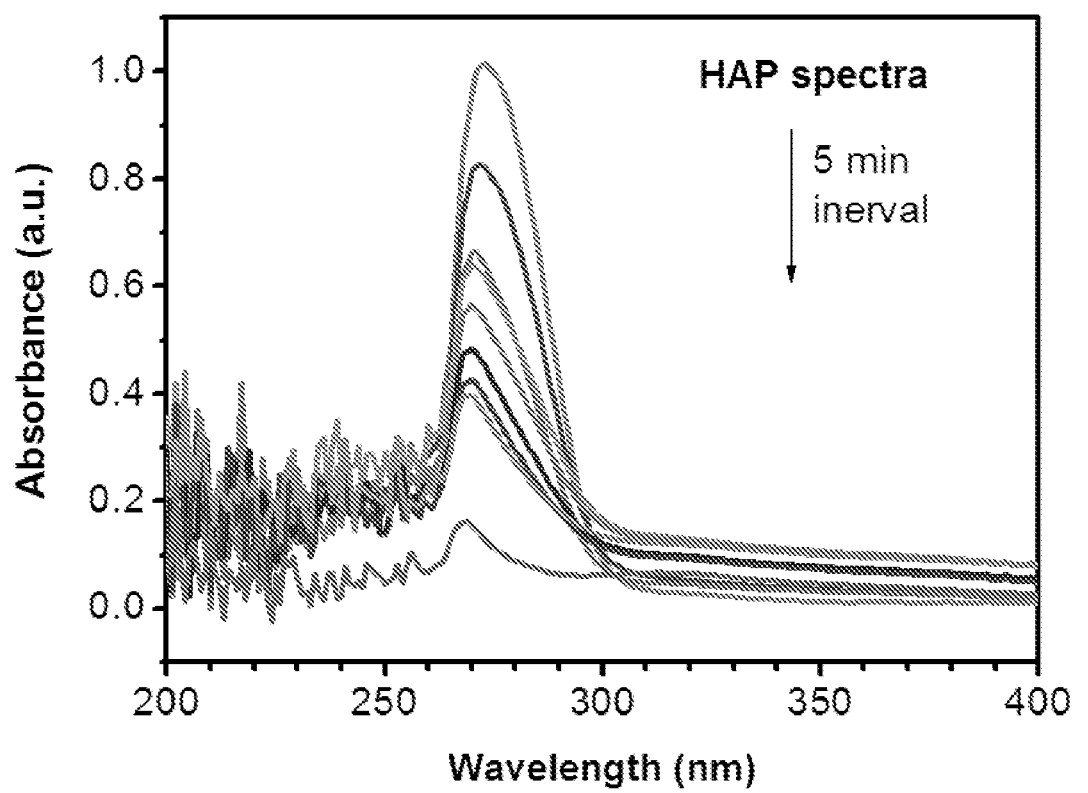
FIG. 10 shows photostability curves of 4-HAP and IMRE-PBP277 in $CHCl_3$ of $1.475 \times 10^{-4}$ mol/L.
Figure 10:
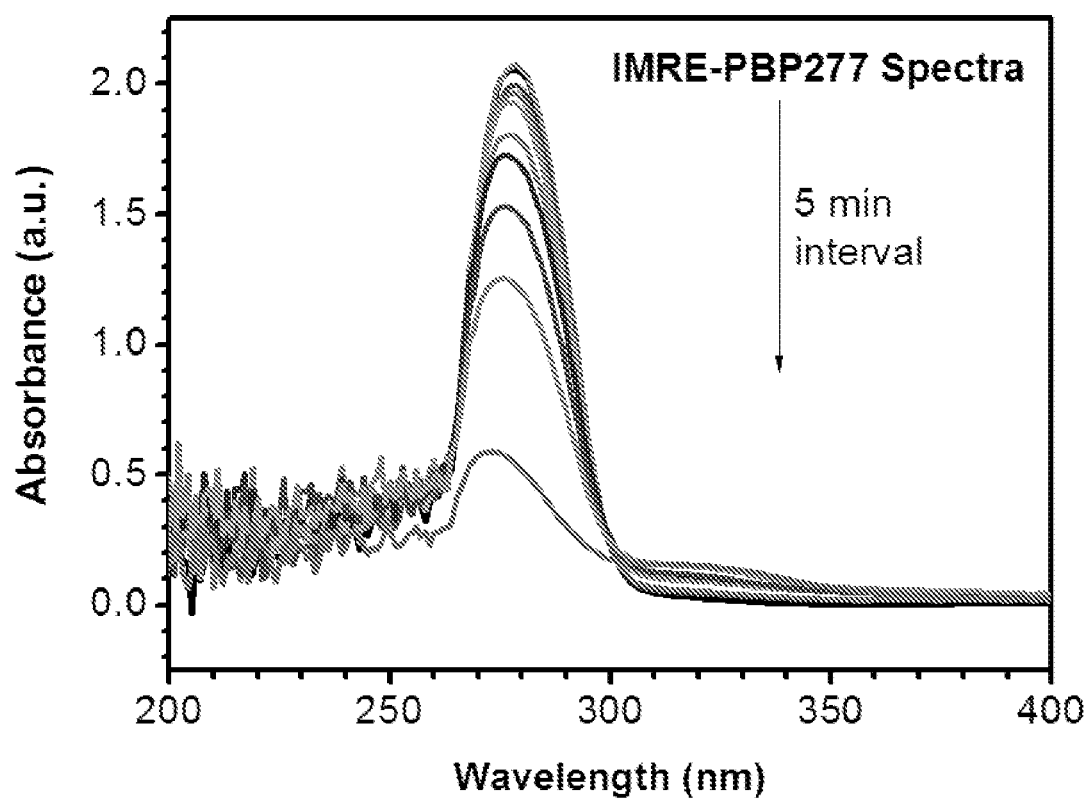
Figure 10:
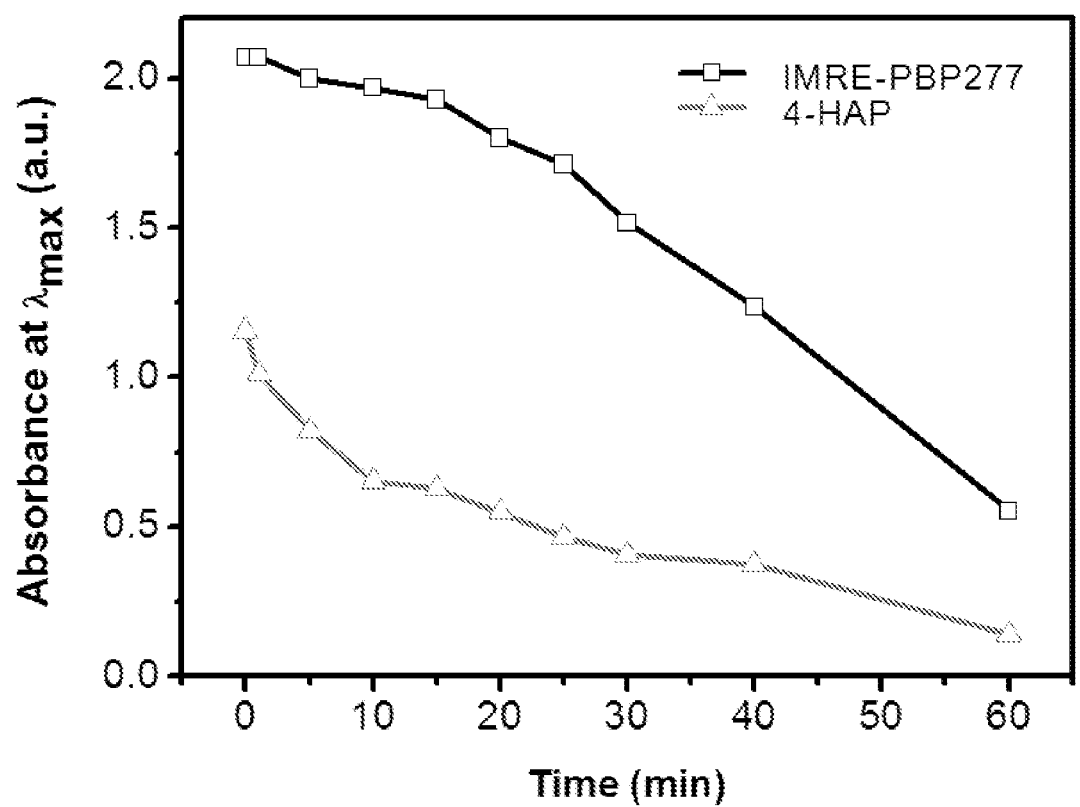
Figure 11:
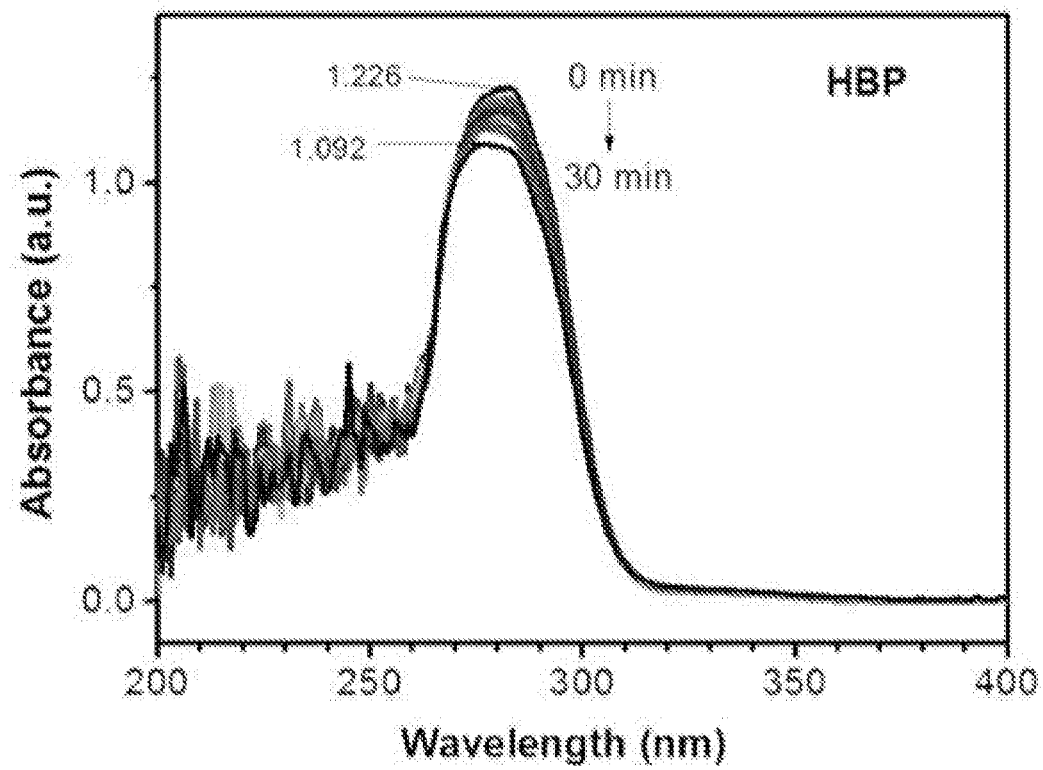
FIG. 11 shows photostability curves of 4-HBP and IMRE-PBP290 in $CHCl_3$ of $1.68 \times 10^{-4}$ mol/L.
Figure 11:
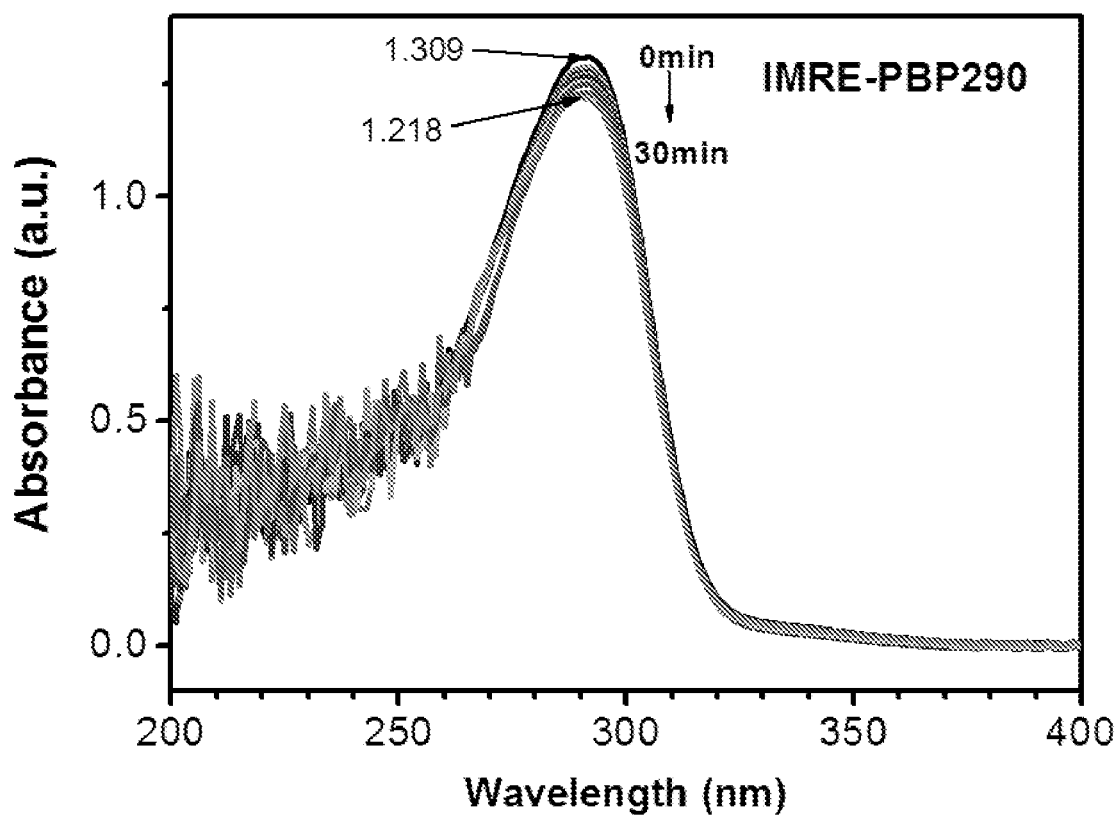
Figure 11:
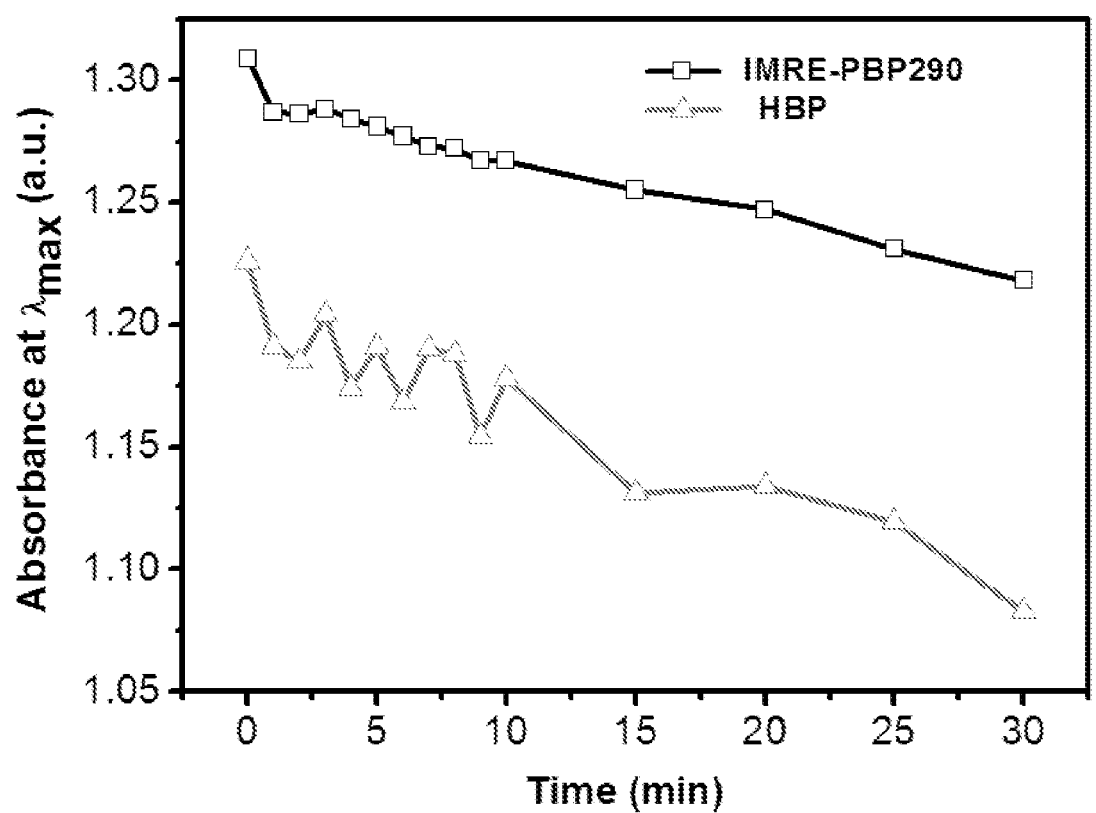

The photostability characteristics of commercial PIs and IMRE PIs are shown in FIGS. 10 and 11. UV spectra were recorded after the solution had been exposed to UV light for subsequent time intervals. FIGS. 10 and 11 reveal that the intensity of UV absorption tends to decrease along with the increase of the UV irradiation time. The decrease in UV absorption intensity of IMRE PIs is much smaller than corresponding commercial PIs. This shows that incorporation of inorganic POSS core enhances the photostability of the photoinitiators over time and the lifetime of photoinitiators, which is one of the limitations that low molecular weight photoinitiators face.

Example 13: Thermal Analysis of Photopolymer Resins

Figure 12:
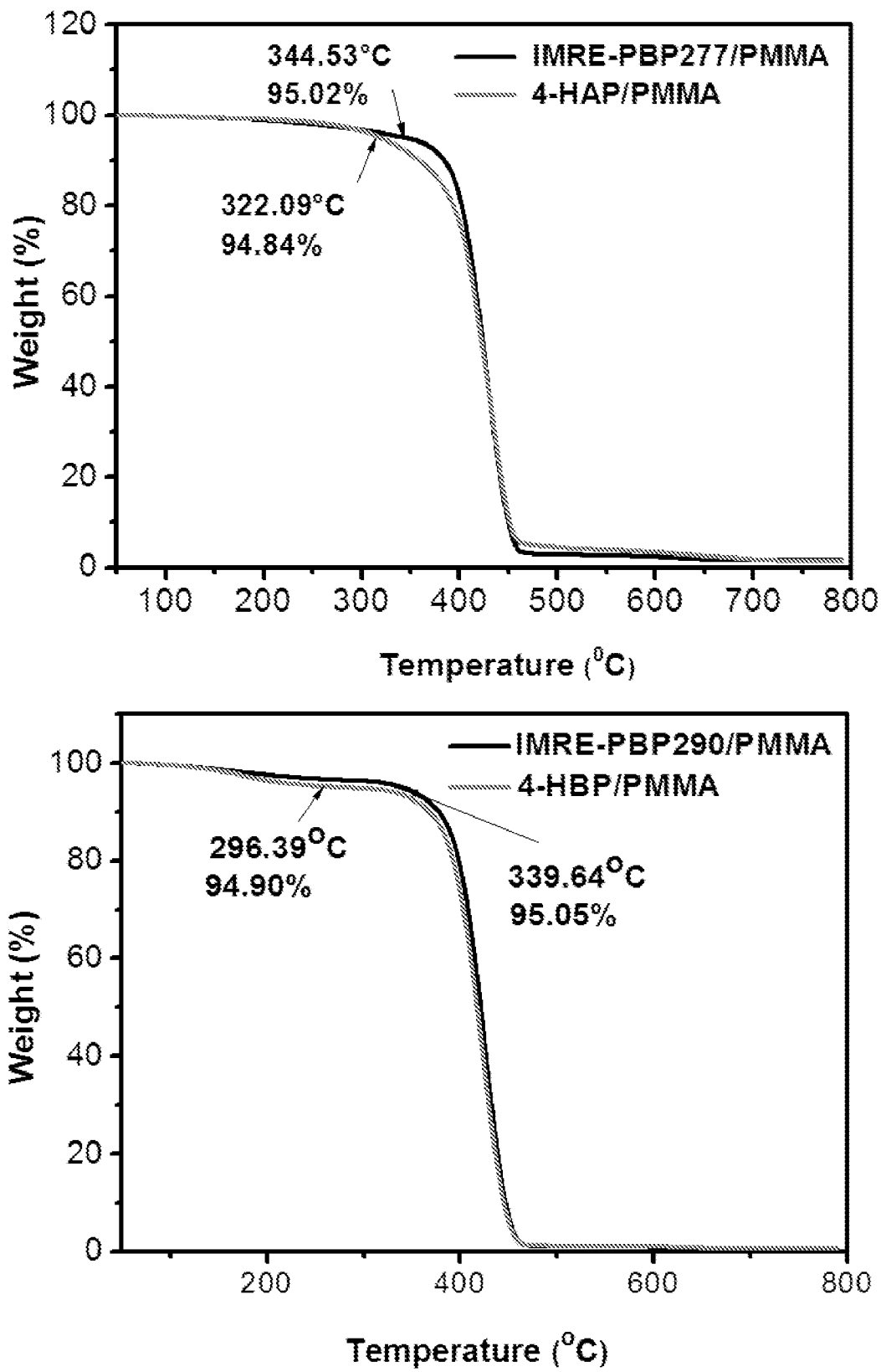
FIG. 12 shows TGA thermograms of PMMA resin fabricated by using IMRE PIs and corresponding commercial PIs in $N_2$.
Figure 13:
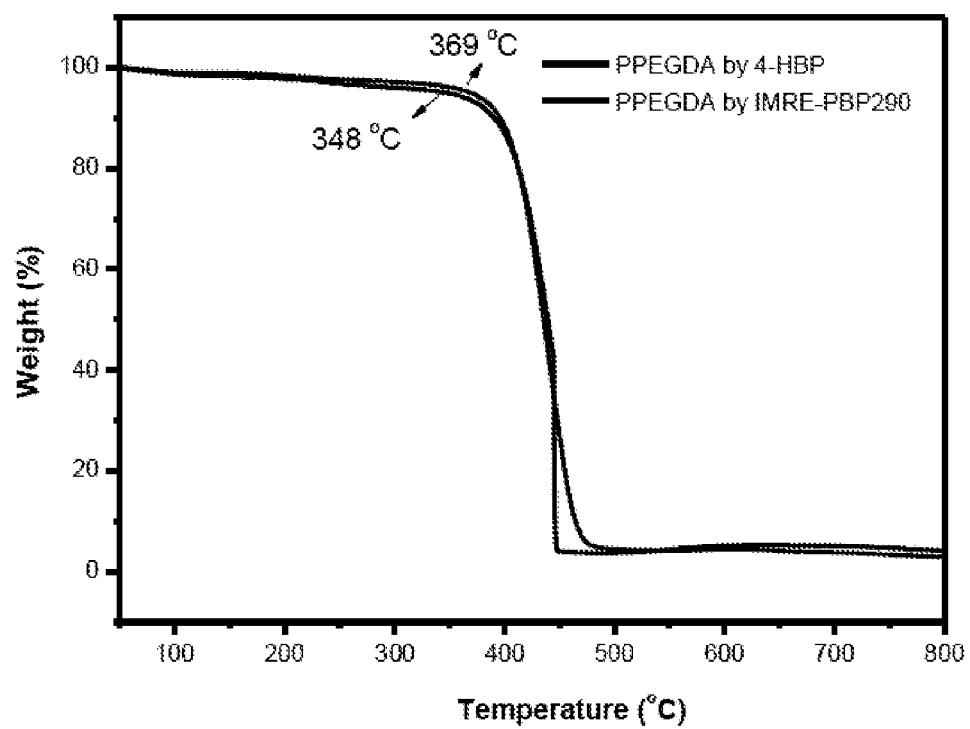
FIG. 13 shows TGA thermograms of PPEGDA resin fabricated by using IMRE PIs and corresponding commercial PIs in $N_2$.

According to the TGA results shown in the FIGS. 12 and 13, decomposition temperatures at 5% weight loss of polymer resins fabricated by using IMRE PIs are generally higher than that of resin fabricated by using corresponding commercial PIs.

Example 14: Glass Transition Temperature ($T_g$) of Photopolymer Resins

Figure 14:
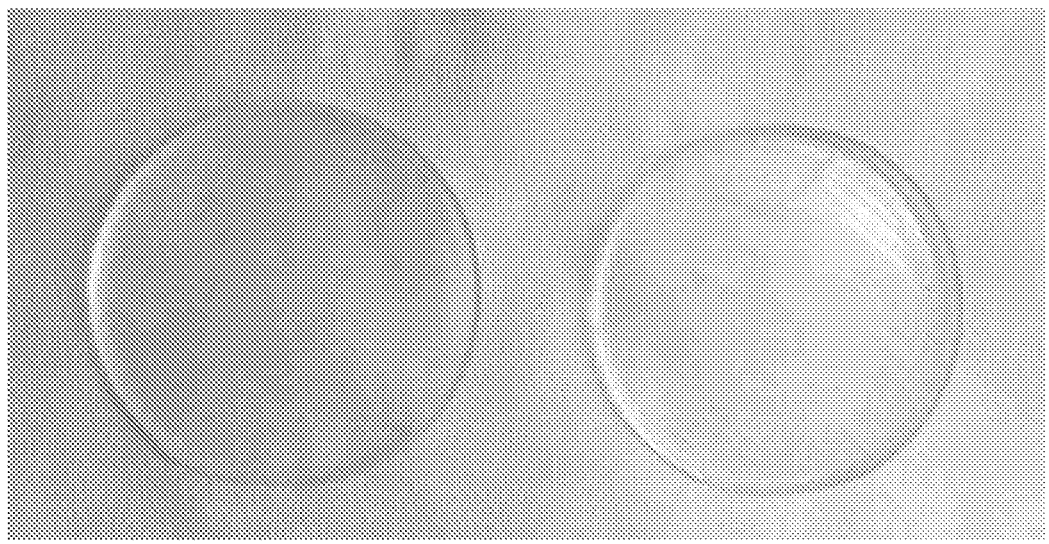
FIG. 14 shows the glass transition temperatures ($T_g$) for poly-poly(ethylene glycol) diacrylate (PPEGDA) polymerized with either BP or IMRE-PBP290.

FIG. 14 shows the glass transition temperatures of polypoly(ethylene glycol) diacrylate (PPEGDA) polymerized with either BP or IMRE-PBP290.

Figure 15:
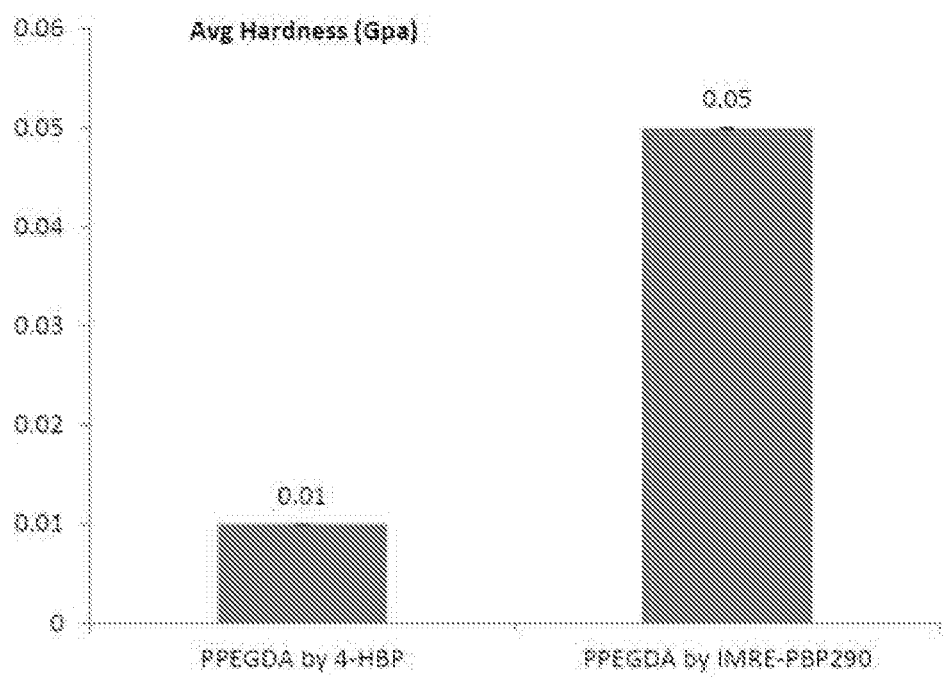
FIG. 15 shows nanoindentation results of PPEGDA samples fabricated by using IMRE PIs and corresponding commercial PIs in $N_2$.
Figure 15:
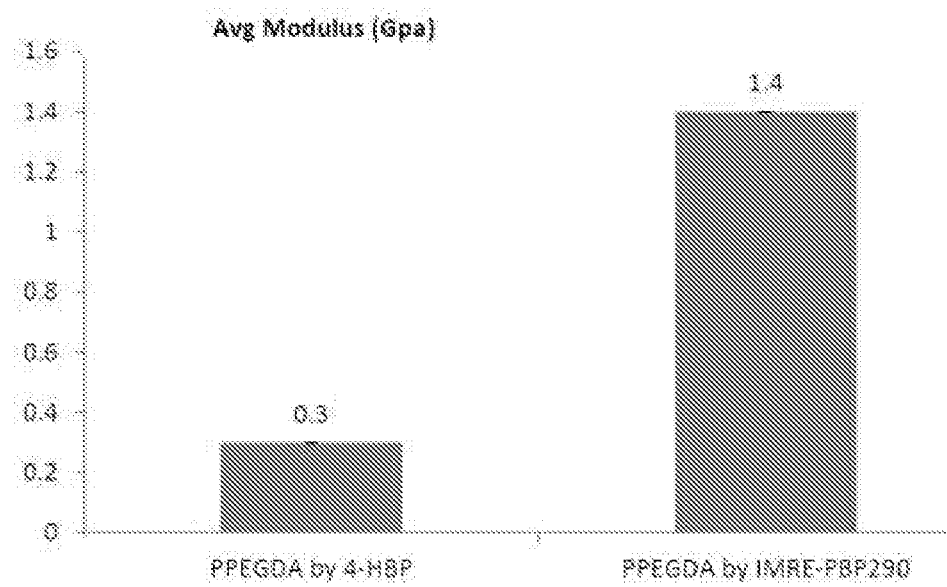

Example 15: Mechanical Study of the Polymer Resins Fabricated by Using IMRE PIs and Corresponding Commercial PIs The mechanical properties of the samples obtained as described in Example 9 are shown in FIG. 15. Polymer film were prepared for nanoindentation by curing the resin on glass microscope slides under UV irradiation, and the nanoindentation films were approximately 300 to 500 microns thick to avoid substrate effects. These polymer films were tested in an Agilent G200 NanoIndenter. The hardness and modulus of polymer resins fabricated by using IMRE PIs are generally higher than that of samples fabricated by using corresponding commercial PIs.

The invention has been described broadly and generically herein. Each of the narrower species and subgeneric groupings falling within the generic disclosure also form part of the invention. This includes the generic description of the invention with a proviso or negative limitation removing any subject-matter from the genus, regardless of whether or not the excised material is specifically recited herein. Other embodiments are within the following claims. In addition, where features or aspects of the invention are described in terms of Markush groups, those skilled in the art will recognize that the invention is also thereby described in terms of any individual member or subgroup of members of the Markush group.

One skilled in the art would readily appreciate that the present invention is well adapted to carry out the objects and obtain the ends and advantages mentioned, as well as those inherent therein. Further, it will be readily apparent to one skilled in the art that varying substitutions and modifications may be made to the invention disclosed herein without departing from the scope and spirit of the invention. The compositions, methods, procedures, treatments, molecules and specific compounds described herein are presently representative of preferred embodiments are exemplary and are not intended as limitations on the scope of the invention. Changes therein and other uses will occur to those skilled in the art which are encompassed within the spirit of the invention are defined by the scope of the claims. The listing or discussion of a previously published document in this specification should not necessarily be taken as an acknowledgement that the document is part of the state of the art or is common general knowledge.

The invention illustratively described herein may suitably be practiced in the absence of any element or elements, limitation or limitations, not specifically disclosed herein. Thus, for example, the terms "comprising", "including", "containing", etc. shall be read expansively and without limitation. The word "comprise" or variations such as "comprises" or "comprising" will accordingly be understood to imply the inclusion of a stated integer or groups of integers but not the exclusion of any other integer or group of integers. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by exemplary embodiments and optional features, modification and variation of the inventions embodied therein herein disclosed may be resorted to by those skilled in the art, and that such modifications and variations are considered to be within the scope of this invention.

The content of all documents and patent documents cited herein is incorporated by reference in their entirety.

The invention claimed is:

1. A photoinitiator compound comprising:
a polyhedral oligomeric silsesquioxane (POSS) moiety and a photoinitiator moiety, wherein the photoinitiator compound has a structure according to formula (I): [R—SiO$_{1.5}$]$_n$ (I), wherein n is 6, 8, 10 or 12 and R is independently selected from the group consisting of H, linear or branched (hetero)alkyl, linear or branched (hetero)alkenyl, (hetero)aryl, (hetero)alkyl aryl, (hetero)aryl alkyl, and the photoinitiator moiety, wherein only one R is the photoinitiator and the photoinitiator compound is a nanoparticle, formula (II):

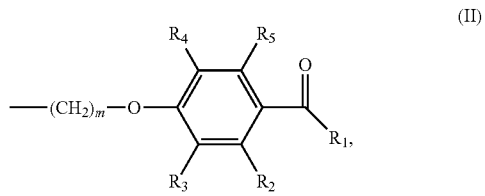

wherein m is an integer ranging from 1 to 20 and $R_1$-$R_5$ are independently selected from the group consisting of H, linear or branched (hetero)alkyl, linear or branched (hetero)alkenyl, (hetero)aryl, (hetero)alkyl aryl, and (hetero)aryl alkyl.

2. The photoinitiator compound of claim 1, wherein n is 8.

3. The photoinitiator compound of claim 1, wherein the photoinitiator compound has a structure according to formula (III):

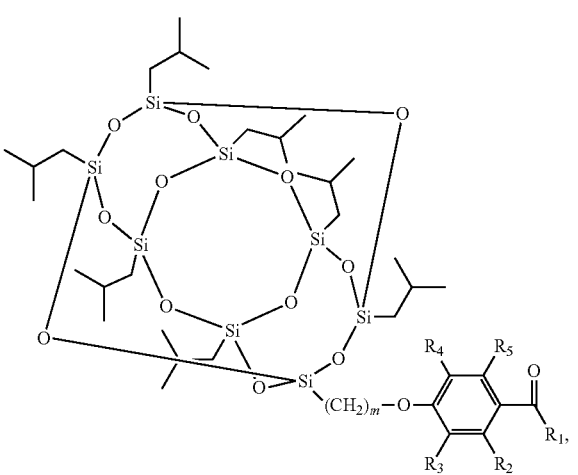

wherein m is an integer ranging from 1 to 20 and $R_1$-$R_5$ are independently selected from the group consisting of H, linear or branched (hetero)alkyl, linear or branched (hetero)alkenyl, (hetero)aryl, (hetero)alkyl aryl, and (hetero)aryl alkyl.

4. The photoinitiator compound according to claim 3, wherein m is 3.

5. The photoinitiator compound according to claim 3, wherein $R_2$-$R_5$ are H.

6. The photoinitiator compound of claim 1, wherein the photoinitiator compound has a structure selected from formulas (IV)-(VI):

(IV)
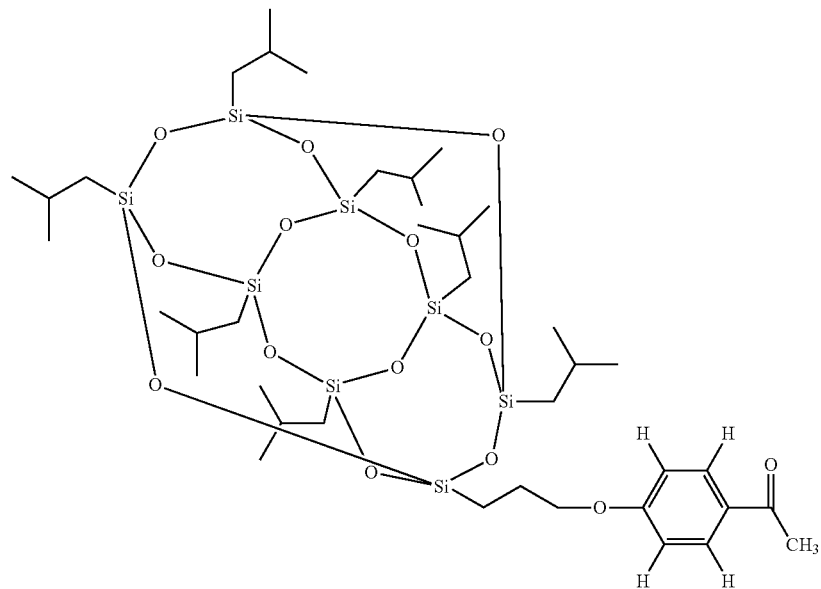
(V)
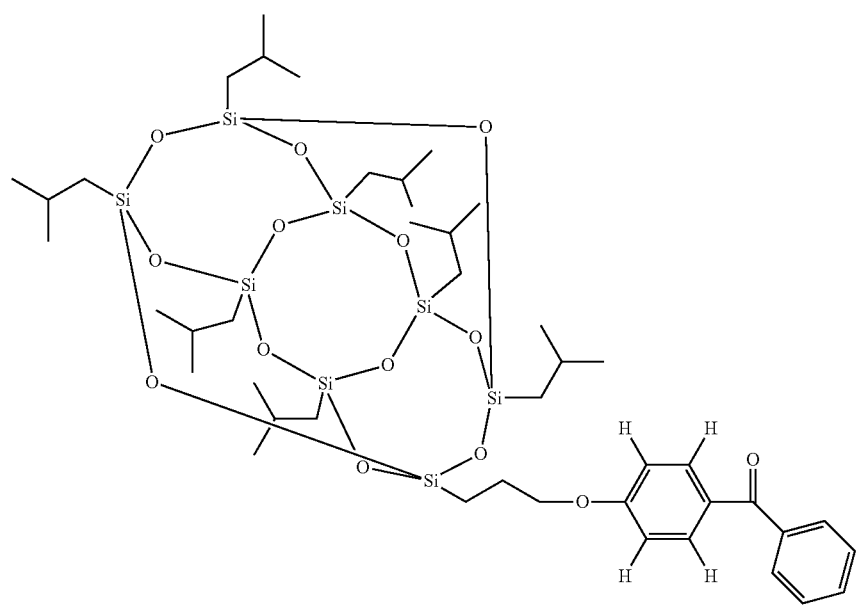

-continued (VI)

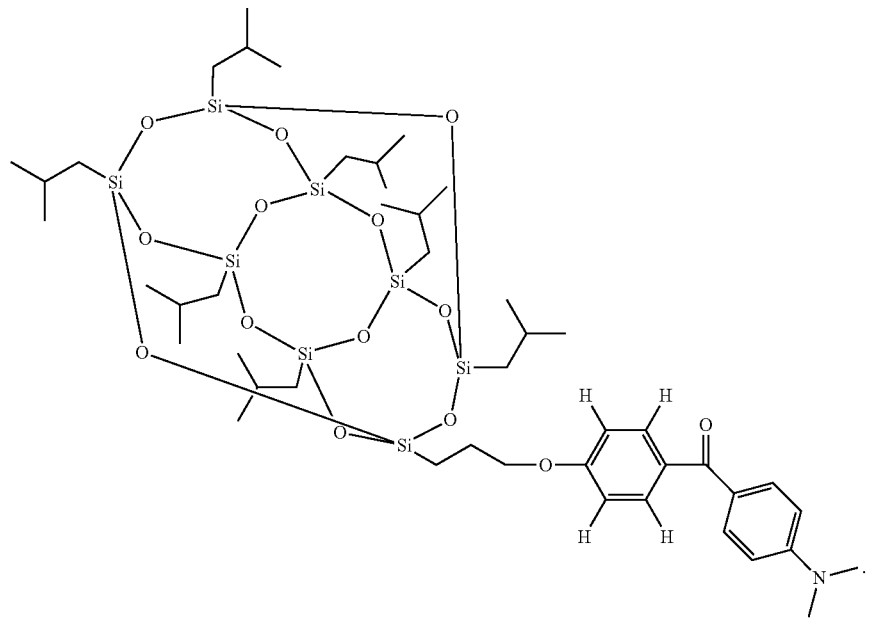

7. A method for the production of a photoinitiator compound, the photoinitiator compound comprising:
a polyhedral oligomeric silsesquioxane (POSS) moiety and a photoinitiator moiety, wherein the photoinitiator compound has a structure according to formula (I): [R—SiO$_{1.5}$]$_n$ (I), wherein n is 6, 8, 10 or 12 and R is independently selected from the group consisting of H, linear or branched (hetero)alkyl, linear or branched (hetero)alkenyl, (hetero)aryl, (hetero)alkyl aryl, (hetero)aryl alkyl, and the photoinitiator moiety, wherein the photoinitiator compound is a nanoparticle, and wherein only one R is the photoinitiator moiety having the structure according to formula (II):

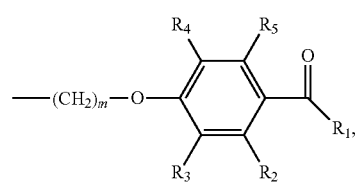

(II)

wherein m is an integer ranging from 1 to 20 and $R_1$-$R_5$ are independently selected from the group consisting of H, linear or branched (hetero)alkyl, linear or branched (hetero)alkenyl, (hetero)aryl, (hetero)alkyl aryl, and (hetero)aryl alkyl, the method comprising:

reacting a compound according to formula (VII)

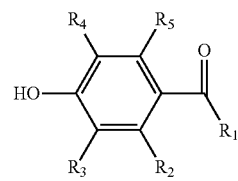

(VII)

wherein $R_1$-$R_5$ are independently selected from the group consisting of H, linear or branched (hetero)alkyl, linear or branched (hetero)alkenyl, (hetero)aryl, (hetero)alkyl aryl, and (hetero)aryl alkyl,
with a compound according to formula (VIII)

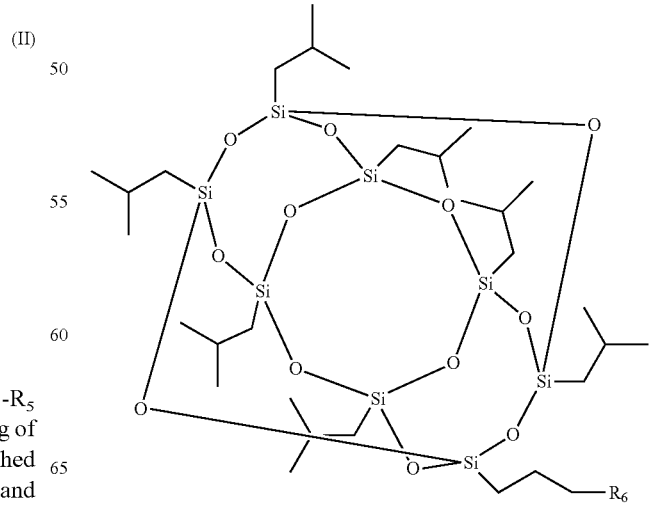

(VIII)

wherein $R_6$ is a halogen,
under conditions to produce the photoinitiator compound.

8. The method according to claim 7, wherein $R_6$ is Br.

9. A photopolymerizable composition comprising
at least one photopolymerizable compound and
at least one photoinitiator compound, the photoinitiator compound comprising:
a polyhedral oligomeric silsesquioxane (POSS) moiety and a photoinitiator moiety, wherein the photoinitiator compound has a structure according to formula (I): [R—SiO$_{1.5}$]$_n$ (I), wherein n is 6, 8, 10 or 12 and R is independently selected from the group consisting of H, linear or branched (hetero)alkyl, linear or branched (hetero)alkenyl, (hetero)aryl, (hetero)alkyl aryl, (hetero)aryl alkyl, and the photoinitiator moiety, wherein the photoinitiator compound is a nanoparticle, and wherein only one R is the photoinitiator moiety having a structure according to formula (II):

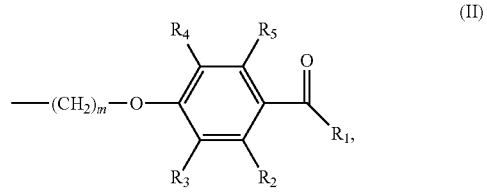
(II)

wherein m is an integer ranging from 1 to 20 and $R_1$-$R_5$ are independently selected from the group consisting of H, linear or branched (hetero)alkyl, linear or branched (hetero)alkenyl, (hetero)aryl, (hetero)alkyl aryl, and (hetero)aryl alkyl.

10. The photopolymerizable composition according to claim 9, wherein the photopolymerizable compound is methyl methacrylate (MMA) or poly (ethylene glycol) diacrylate (PEGDA).

11. The photopolymerizable composition according to claim 9, wherein the photopolymerizable composition is cured.

12. The method according to claim 7, wherein the compounds are reacted in the presence of one or more of the following: tetrahydrofuran (THF), $K_2CO_3$, 18-crown-6, or a combination thereof.

13. The method according to claim 7, wherein the compounds are reacted for an amount of time ranging from about 4 hours to about 12 hours.

14. The method according to claim 7, wherein the compounds are reacted at a temperature ranging from about 60° C. to about 100° C.

15. The method according to claim 7, wherein the compounds are reacted under argon atmosphere.

* * * * *